US009046979B2

(12) United States Patent
Nack

(10) Patent No.: US 9,046,979 B2
(45) Date of Patent: Jun. 2, 2015

(54) PANEL CONFIGURATOR ENGINE

(75) Inventor: John Nack, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 1049 days.

(21) Appl. No.: 12/201,919

(22) Filed: Aug. 29, 2008

(65) Prior Publication Data
US 2014/0033083 A1 Jan. 30, 2014

(51) Int. Cl.
G06F 3/0481 (2013.01)
G06F 3/048 (2013.01)
G06F 7/00 (2006.01)
G06F 7/10 (2006.01)
G06F 17/30 (2006.01)

(52) U.S. Cl.
CPC ........ *G06F 3/048* (2013.01); *G06F 7/00* (2013.01); *G06F 7/10* (2013.01); *G06F 17/30* (2013.01)

(58) Field of Classification Search
USPC .......................................................... 715/771
See application file for complete search history.

(56) References Cited

U.S. PATENT DOCUMENTS

| 5,398,312 | A | * | 3/1995 | Hoffmann | 604/218 |
| 5,495,567 | A | * | 2/1996 | Iizawa et al. | 715/762 |
| 6,330,575 | B1 | * | 12/2001 | Moore et al. | 715/234 |
| 6,847,973 | B2 | * | 1/2005 | Griffin et al. | 1/1 |
| 6,862,589 | B2 | * | 3/2005 | Grant | 707/779 |
| 7,925,973 | B2 | * | 4/2011 | Allaire et al. | 715/248 |
| 2003/0202014 | A1 | * | 10/2003 | Wood | 345/763 |
| 2007/0038567 | A1 | * | 2/2007 | Allaire et al. | 705/50 |
| 2007/0038931 | A1 | * | 2/2007 | Allaire et al. | 715/526 |
| 2008/0040681 | A1 | * | 2/2008 | Synstelien et al. | 715/765 |

* cited by examiner

Primary Examiner — Boris Pesin
Assistant Examiner — Matthew Ell
(74) Attorney, Agent, or Firm — Shook, Hardy & Bacon L.L.P.

(57) ABSTRACT

A method including receiving input identifying a panel associated with a software application, the software application including a Graphical User Interface (GUI) and the panel comprising a discrete area of the GUI within which to group software objects to control the software application. Additionally, the method includes processing the input to identify an object of the software objects to be included in the panel. Further, the method includes generating a panel definition including the object and dimensions of the panel, the panel definition to be processed to render the GUI.

21 Claims, 24 Drawing Sheets

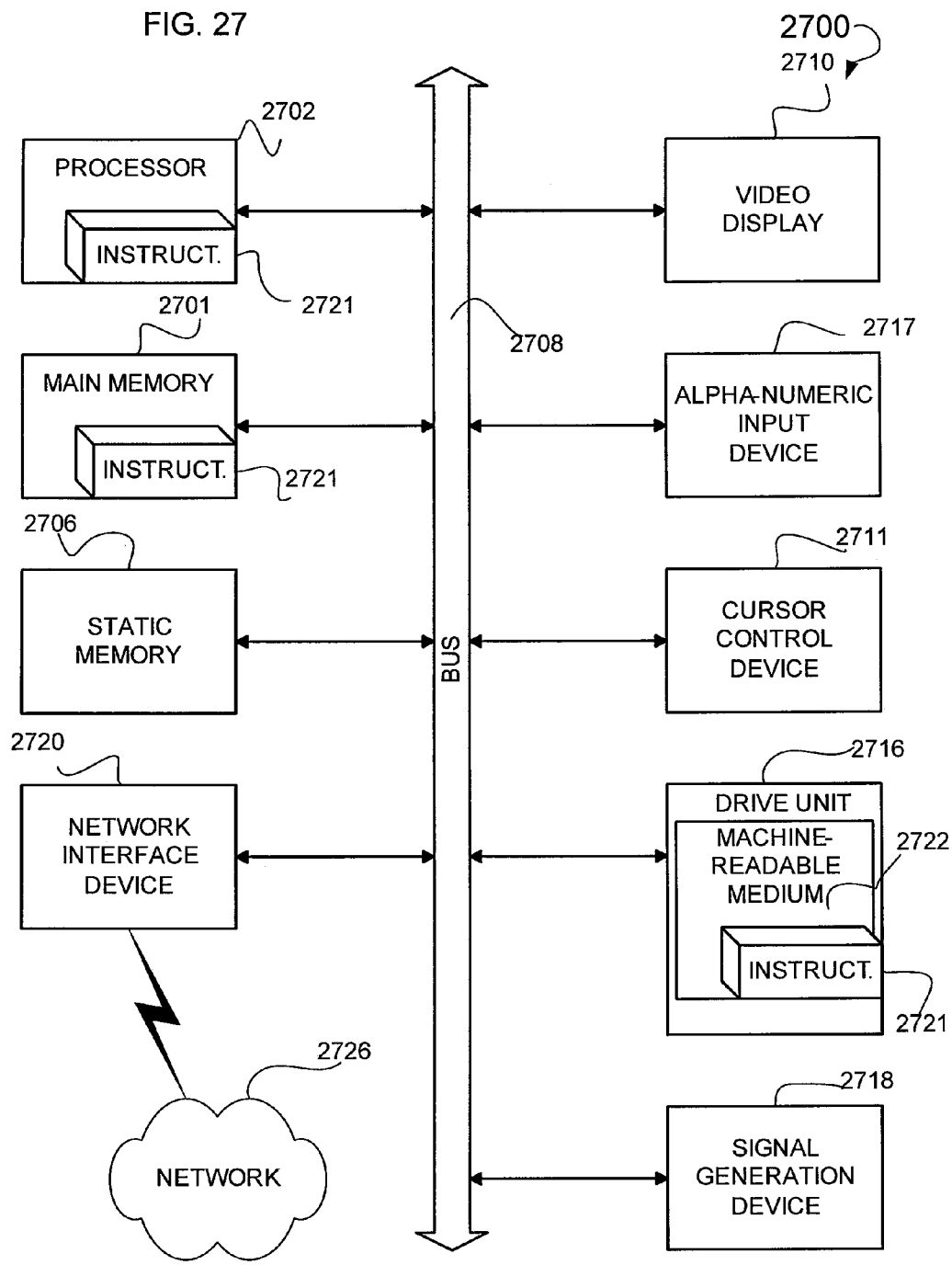

US 9,046,979 B2

PANEL CONFIGURATOR ENGINE

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright ©2008, Adobe Systems Incorporated. All Rights Reserved.

TECHNICAL FIELD

The present application relates generally to the technical field of algorithms and programming and, in one specific example, the generation of Graphical User Interfaces (GUI).

BACKGROUND

GUIs are used to facilitate user interaction with a software application. The user may be required to learn how to use the software application by mastering the GUI and the functionality associated with the GUI. These GUIs may be specific to the software application.

BRIEF DESCRIPTION OF THE DRAWINGS

Some embodiments are illustrated by way of example and not limitation in the figures of the accompanying drawings in which:

FIG. 27 shows a diagrammatic representation of a machine in the form of a computer system, according to an example embodiment, that executes a set of instructions to perform any one or more of the methodologies discussed herein.

DETAILED DESCRIPTION

Figure 1:
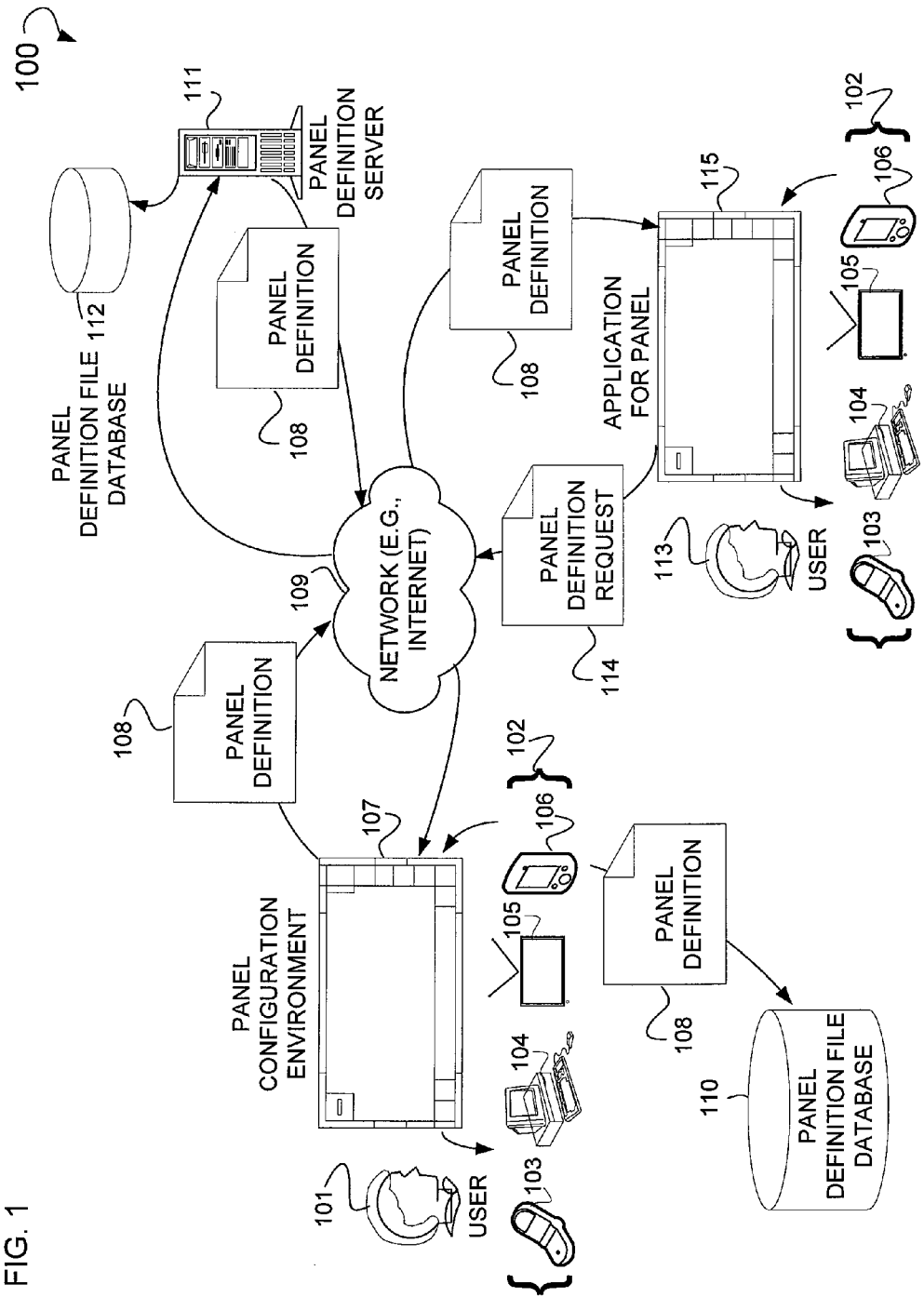
FIG. 1 is a diagram of a system, according to an example embodiment, used to generate a panel definition.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method is illustrated that allows for the creation of custom GUI panels for a software application, the panel having various objects associated therewith. A panel is a discrete area of a GUI that is used to group software objects. Objects may include tools, commands, widgets, or some other suitable software object. A tool is a program or application used to create, debug, maintain, or otherwise support other software programs and applications. A tool may be represented graphically by an icon. A command is a directive to a computer program to perform a specific task. A command may be represented graphically by an icon. A widget is an element of a GUI that displays an information arrangement changeable by the user. A tool may be represented graphically by an icon. In some example embodiments, a widget may be used to retrieve and display digital content that is remotely retrieved through the use of a Uniform Resource Locator (URL). Example software applications may include Adobe CREATIVE SUITE®, PHOTOSHOP®, ACROBAT®, COLD FUSIONS, DREAMWAVER®, IN-DESIGN®, FLASH®, ILLUSTRATOR®, FIREWORKS®, ENCORE®, FLEX®, or some other suitable software application.

In some example embodiments, a system and method are illustrated that allows for the creation of custom GUI panels for software applications, wherein a panel definition to created. A panel definition may include an object or data structure including data describing the dimensions of a panel, the software application with which the panel is associated, and the software objects included in the panel. A dimension of a panel is a height or width value of a panel described in terms of, for example, pixel values. A panel definition may be included in a panel definition file. In one example embodiment, the panel definition file is written using an eXtensible Markup Language (XML). In some example embodiments, a graphical pointer, controlled by an input device is used to select certain objects to be displayed as part of a panel. A graphical pointer is a cursor. An input device includes a mouse, keyboard, light pen, touch screen, or other suitable input device. Selection may include the execution of a right-click function, a mouse-over function, or a left-click function, through the use of the input put device. Further, the input device is used to focus upon the functionality that is displayed as part of the panel. Focus indicates the objects which are currently selected to receive input.

In some example embodiments, a system and method are illustrated that processes the panel definition using a template file written in a scripting language. A template file is a file that describes the functionality associated with the software objects, and, when executed by a computer system, facilitates the functionality described by the template file. In one example embodiment, a computer system may execute the template file. During the course of executing this template file, the computer system processes the panel definition and based upon this processing makes available a panel and associated software objects for use within a GUI. Example scripting language used to write the template file may include ACTIONSCRIPT™, PERL™, PHYTHON™, JAVA™, JAVA SCRIPT™, VISUAL BASIC SCRIPT™, or some other suitable scripting language. In some example embodiments, the template file is stored as a Shockwave Flash File (SWF).

In some example embodiments, the panel definition files may be stored onto a computer system in the form of a panel definition server, and distributed in exchange for monetary remuneration. A commerce server may be operatively connected to the panel definition server. Operatively connected includes a logical or physical connection. A user may request a panel definition file from the panel definition server. In exchange, the user tenders a monetary payment for the panel definition file. The process for payment is more fully discussed below.

Example System

FIG. 1 is a diagram of example system 100 used to generate a panel definition. Shown is a user 101 using one or more devices 102 that generate a panel definition 108. These one or more devices 102 include a cell phone 103, a computer system 104, a television or monitor 105, a personal digital assistant (PDA) 106, or a smart phone (not shown). These one or more devices 102 are used to generate a panel configuration environment 107. This panel configuration environment 107 is displayed to the user 101 as a part of a GUI. Further, these one or more devices 102 are used to transmit the panel definition 108 across a network 109 to be received by a panel definition server 111. Moreover, this panel definition 108 is stored to a panel definition database 110 that is operatively connected to, and accessible by, the one or more devices 102. Operatively connected includes, for example, a physical or logical connection. Additionally, a panel definition file database 112 is operatively connected to the panel definition server 111, wherein the panel definition server 111 stores the panel definition 108 to the panel definition file database 112 as a panel definition file. A user 113 may generate a panel definition request 114 using an application 115 (e.g., the application for panel). This application 115 may be implemented by the previously illustrated one or more devices 102. Further, this application 115 has a GUI associated with it. These one or more devices 102 may be used by the user 113 to transmit the panel definition request 114 across the network 109 to be received by the panel definition server 111. The panel definition server 111 retrieves the panel definition 108, and transmits it back across the network 109 to be received by the one or more devices 102 used by the user 113. This panel definition 108 is displayed in conjunction with the application 115. Additionally, in some example embodiments, the panel definition request 114 is transmitted across the network 109 to be received by the one or more devices 102 operated or otherwise used by the user 101. In response to the panel definition request 114, the one or more devices 102 used by the user 101, may transmit the panel definition 108 back across the network 109 to be received by the one or more devices 102 operated or used by the user 113.

Figure 2:
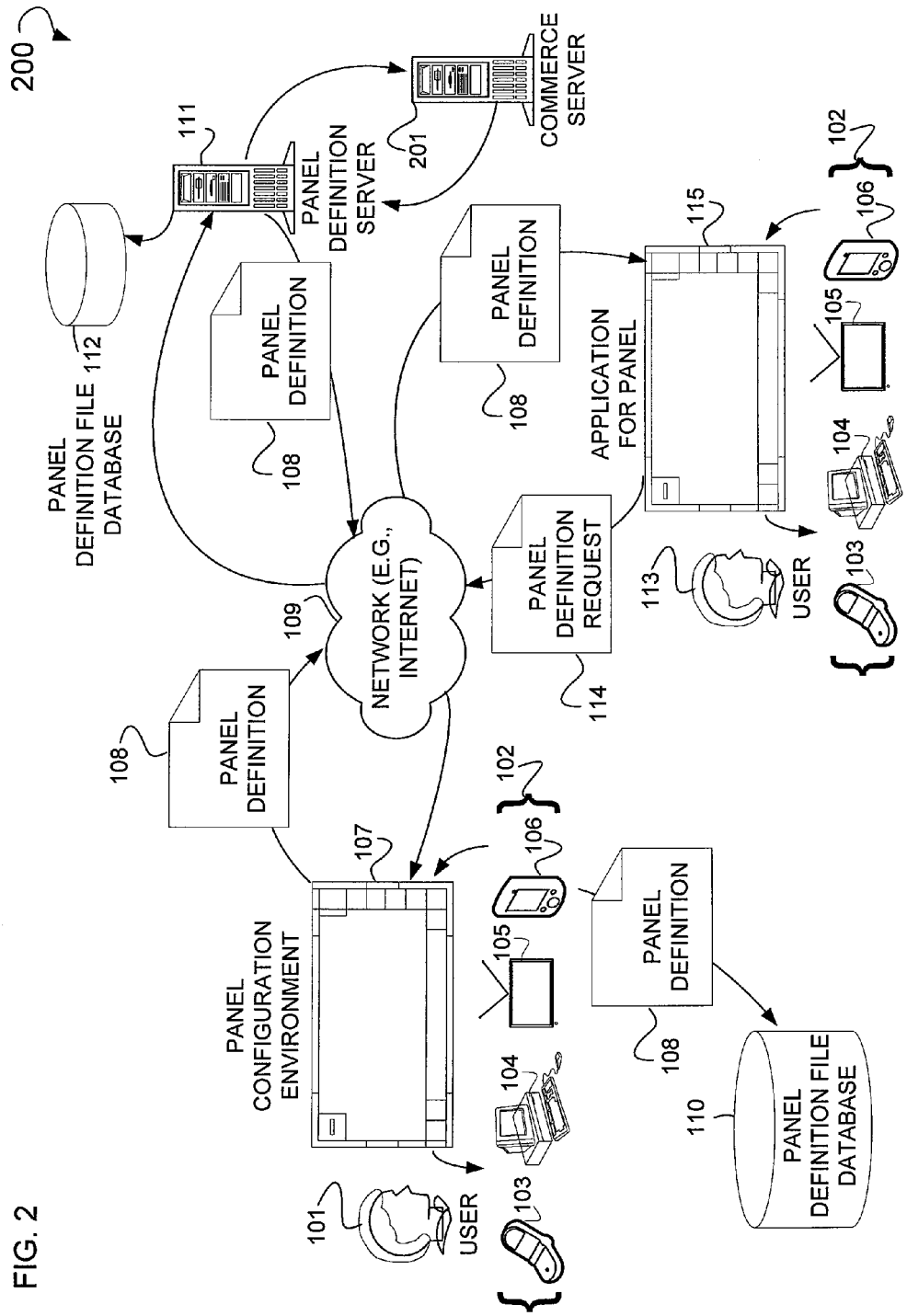
FIG. 2 is a diagram of a system, according to an example embodiment, illustrating the use of a commerce server in conjunction with a system used to generate a panel definition.

FIG. 2 is a diagram of an example system 200 illustrating the use of a commerce server in conjunction with a system used to generate a panel definition. Shown is a previously illustrated panel definition server 111 that is operatively connected to a commerce server 201. This commerce server 201, as will be more fully described below, may be used to verify information, in the form of financial information, and identity information related to the user 101. The panel definition 108 may be purchased by the user 101, or the user 113. The system and method used to facilitate this purchase will be more fully illustrated below (see e.g., FIG. 23).

Example Interfaces

Figure 3:
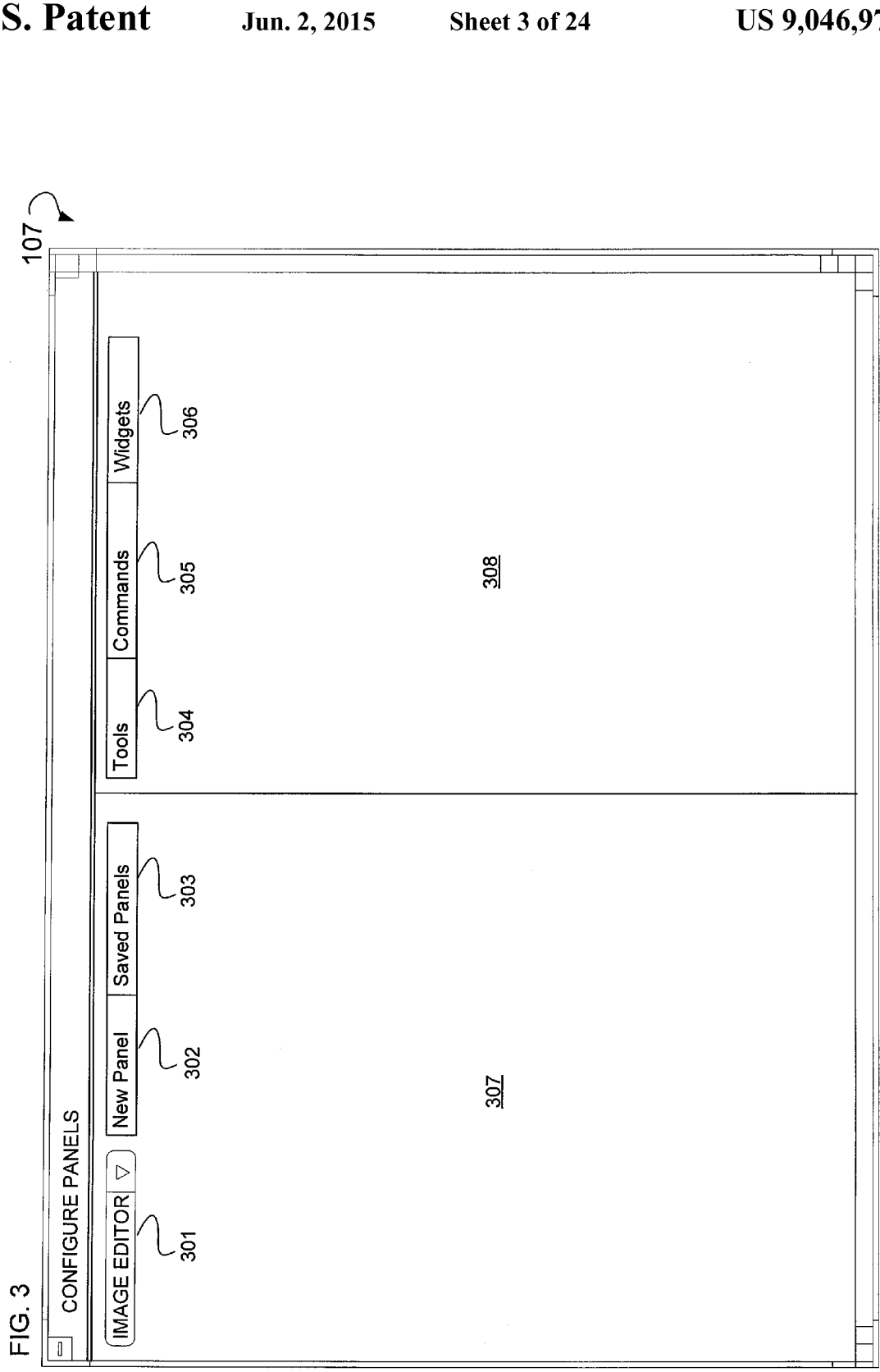
FIG. 3 is a diagram of a panel configuration environment, according to an example embodiment, and the display areas associated therewith.

FIG. 3 is a diagram of an example panel configuration environment 107, and the display areas associated therewith. Shown is a panel configuration environment 107 that includes a drop-down menu 301. This drop-down menu 301 is used by, for example, the user 101 to select a particular software application with which the panel definition 108 is to be associated. Further, a screen object 302 is shown that allows the user 101 to select a new panel to be generated. Additionally, a screen object 303 is shown that allows the user 101 to save the panels and associated tools, commands or widgets as part of the panel definition 108. Also shown is a screen object 304 titled "Tools" that allows the user 101 to select tools for the panel. A screen object 305 titled "Commands" is shown that allows the user 101 to select commands for the panel. A screen object 306 is shown titled "Widgets" that allows the user 101 to select widgets for the panel. A display area 307 is shown, and a display area 308 is also shown. With respect to display area 307, this display area 307 is used to build a panel and to associate tools, commands or widgets with this panel. With respect to display area 308, this display area 308 is used to display potential tools, commands and widgets to be associated with a panel.

Figure 4:
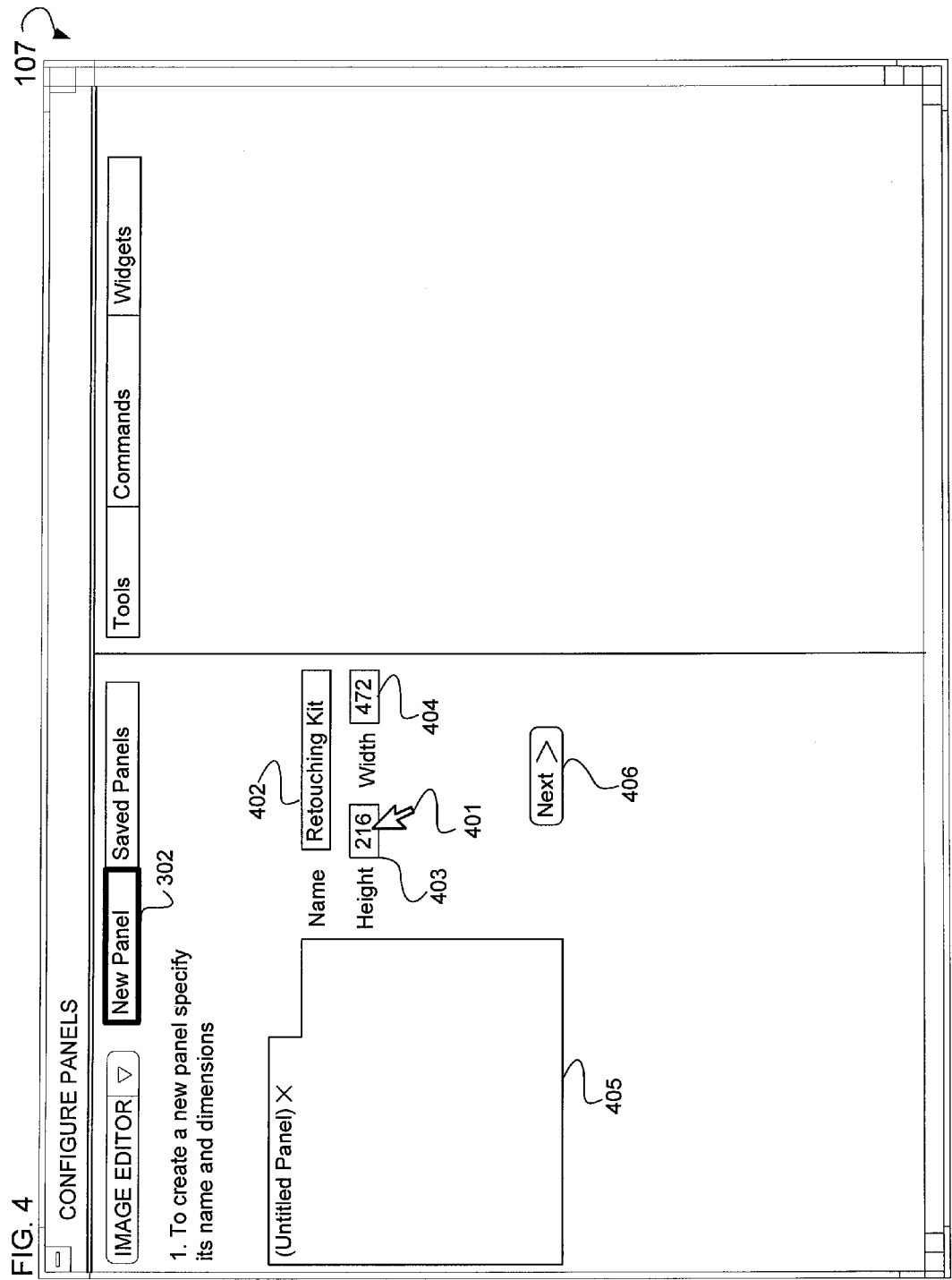
FIG. 4 is a diagram illustrating a panel configuration environment, according to an example embodiment, wherein a new panel is generated.

FIG. 4 is a diagram illustrating an example of the panel configuration environment 107, wherein a new panel is generated. Shown is the panel configuration environment 107 that includes a graphical pointer 401. Using an input device, the user 101 manipulates the graphical pointer 401 to select a height and width for a new panel. This new panel may be initially generated via the selection of the screen object 302 via the graphical pointer 401. Data may be entered into a text box 403 to define the height of the new panel. Further, data may be entered into a text box 404 to define the width of the panel. Additionally, a title may be entered into a text box 402. Here the title is "Retouching kit." The entry of data into the text boxes 402, 403 and 404 may be facilitated through the use of the graphical pointer 401 in conjunction with, for example, a keyboard. Further, shown is panel 405 that is a generic panel, wherein the generic panel does not yet reflect the height, width and title data entered into the text boxes 402, 403 and 404. A screen object 406 is shown that allows the user 101 to go to the next screen for the panel configuration environment 107.

Figure 5:
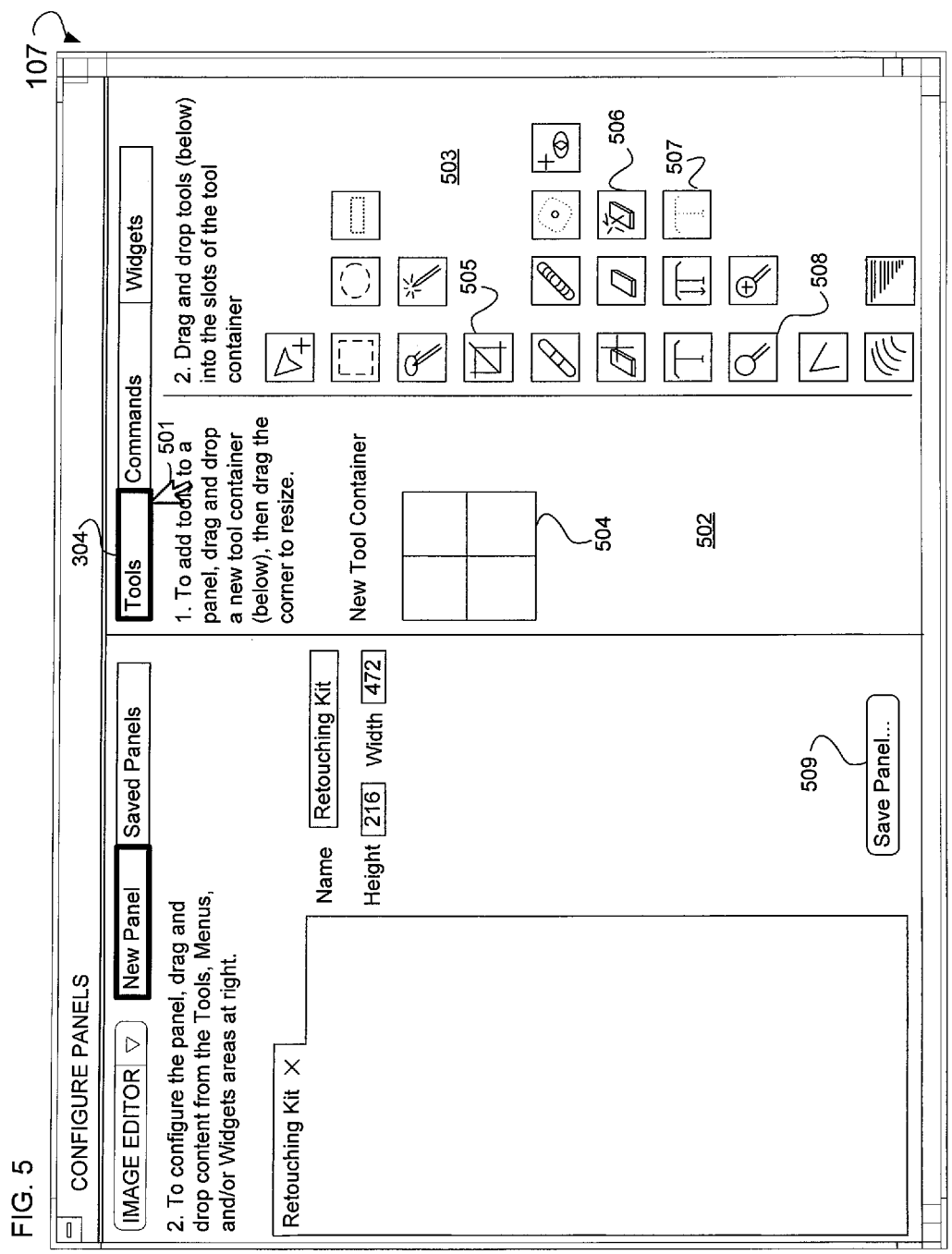
FIG. 5 is a diagram of a panel configuration environment, according to an example embodiment, illustrating the association of tools with a panel.

FIG. 5 is a diagram of an example panel configuration environment 107 illustrating the association of tools with a panel. Shown is a graphical pointer 501 that allows the user 101 to select the screen object 304 to display tools to be included within a panel. In cases where the screen object 304 is selected, the previously illustrated display area 308 is divided into a display area 502, and a display area 503. With respect to display area 502, a new tool container 504 is shown. With respect to display area 503, a plurality of tools are displayed wherein each one of these tools has an associated functionality. For example, a tool 505 is shown that allows for the dimensions of an image to be scaled. Further, shown is a tool 506 that allows for portions of an image to be erased. Additionally, shown is a tool 507 that allows for the changing of lines associated with an image. A tool 508 is shown that allows for an image to be searched. These various tools 505 through 508 may be associated with, and provide functionality that arises from, a particular software application, such as an image editing software application. Also shown in FIG. 5 is a screen object 509 that allows for a panel to be saved for future use.

Figure 6:
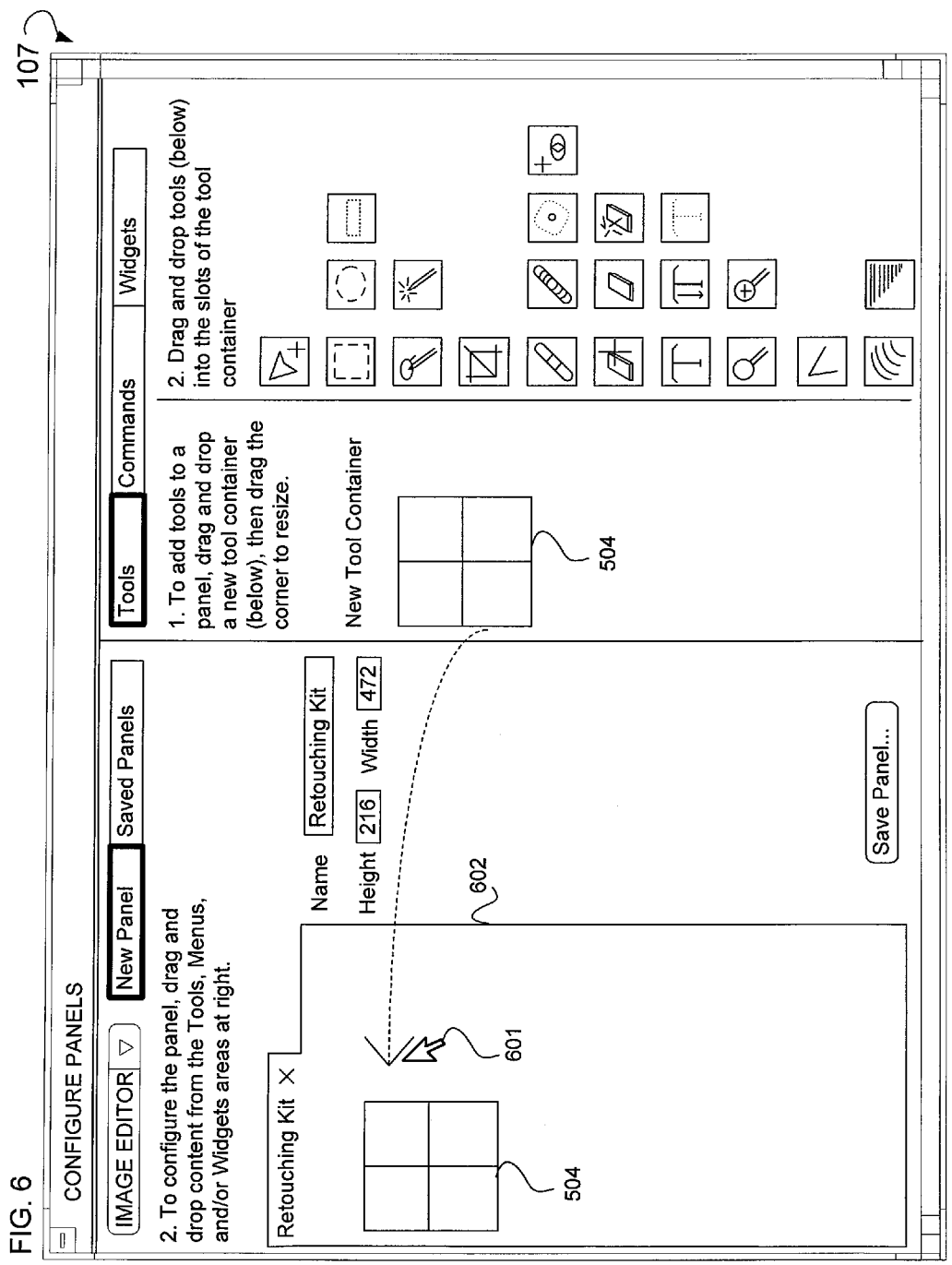
FIG. 6 is a diagram illustrating a panel configuration environment, according to an example embodiment, and the associating of a new tool container with a panel.

FIG. 6 is a diagram illustrating an example of the panel configuration environment 107 and the associating of a new tool container with a panel. Shown is a graphical pointer 601 that is manipulated by the user 101 using some type of input device. Using this graphical pointer 601, the previously illustrated new tool container 504 is manipulated and ultimately positioned upon the panel 602. Manipulation may include the use of a function associated with the graphical pointer 601. This function may include a drag and drop function, mouse-over function, left-click function, right-click function, or click-on function. This new tool container 504 may, subsequently, provide a framework within which various tools may be inserted.

Figure 7:
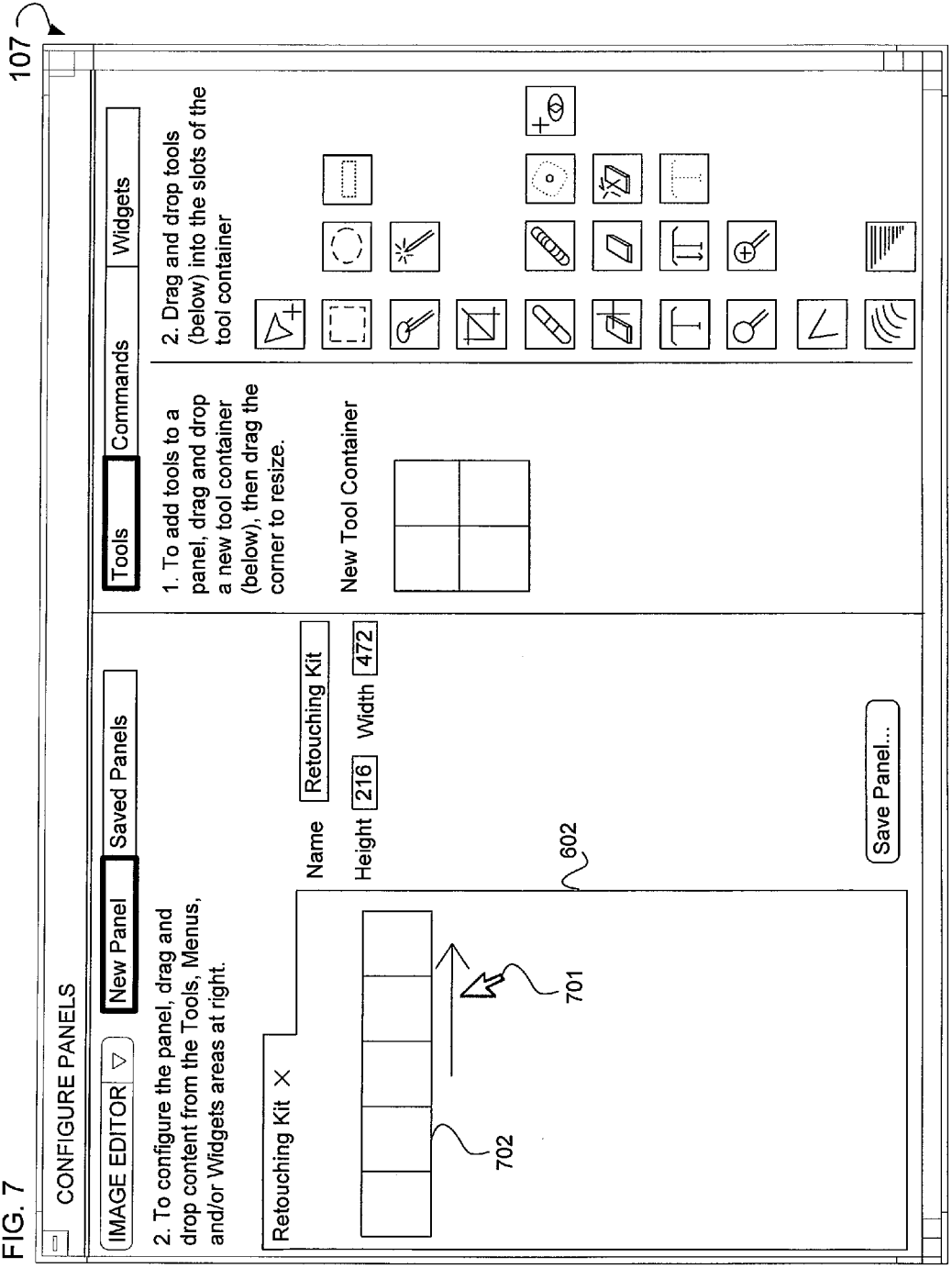
FIG. 7 is a diagram of a panel configuration environment, according to an example embodiment, illustrating the modification of the new tool container.

FIG. 7 is a diagram of an example panel configuration environment 107 illustrating the modification of the new tool container 504. Shown is a graphical pointer 701 that is manipulated by the user 101 using some type of input device. This graphical pointer 701, and function associated therewith, is used to resize the previously illustrated new tool container 504 into a tool container 702. This tool container 702 reflects a horizontal rearrangement of the new tool container 504. The rearrangement of the new tool container 504 may also include a vertical, diagonal, or some other suitable type of rearrangement.

Figure 8:
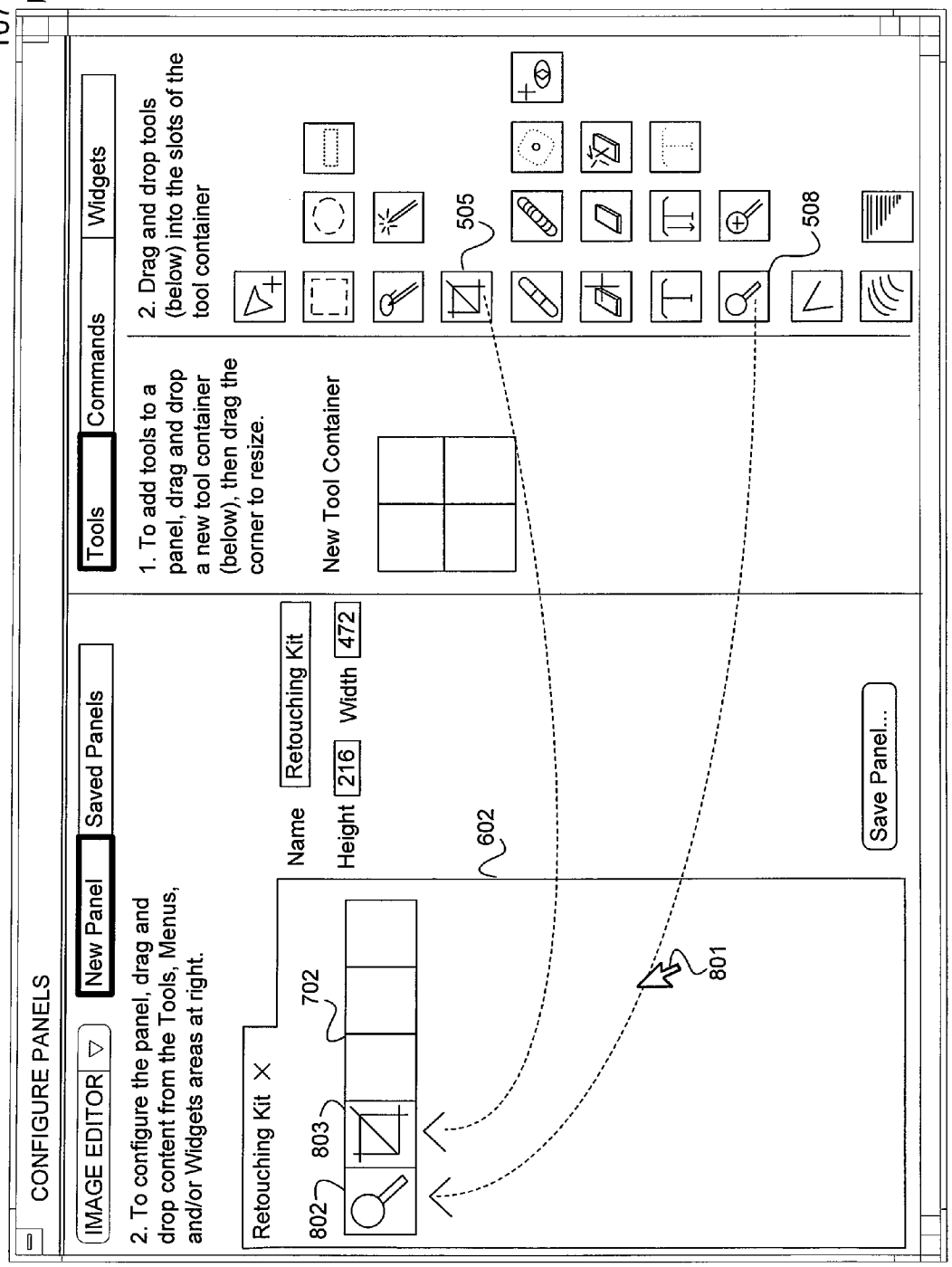
FIG. 8 is a diagram of a panel configuration environment, according to an example embodiment, illustrating the placement of tools into the tool container.

FIG. 8 is a diagram of an example panel configuration environment 107 illustrating the placement of tools into the tool container 702. Shown is a graphical pointer 801, and function associated therewith, that is use to manipulate the tools 505 and 508 for placement into the tool container 702. For example, the tool 505 may be placed into a position 803 that is part of the tool container 702. The tool 508 may be placed into a position 802 that is part of the tool container 702.

Figure 9:
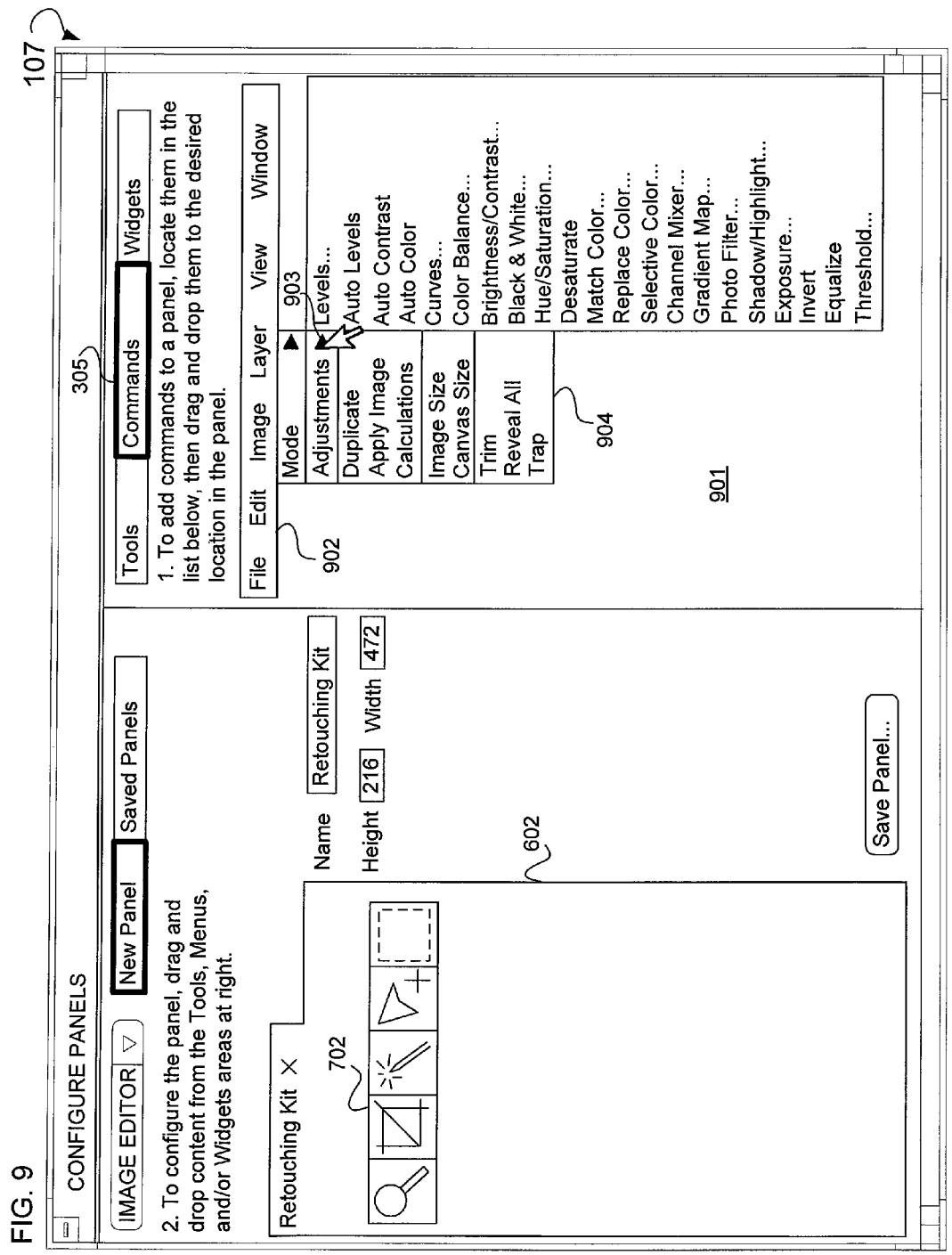
FIG. 9 is a diagram of a panel configuration environment, according to an example embodiment, illustrating the creation of commands to be inserted into a panel.

FIG. 9 is a diagram of an example panel configuration environment 107 illustrating the creation of commands to be inserted into the panel 602. Shown is a display area 901 (e.g., the former display area 308) that illustrates various commands that may be associated with the panel 602. These commands are displayed through the execution of the screen object 305. Using a graphical pointer 903, and functions associated therewith, commands are selected from a command tool bar 902. These commands are displayed via, for example, a drop-down menu 904. Using the graphical pointer 903, these commands are selected from the drop-down menu 904 and placed into the panel 602. This process for selecting and placement of these commands within the panel 602, is more fully shown below.

Figure 10:
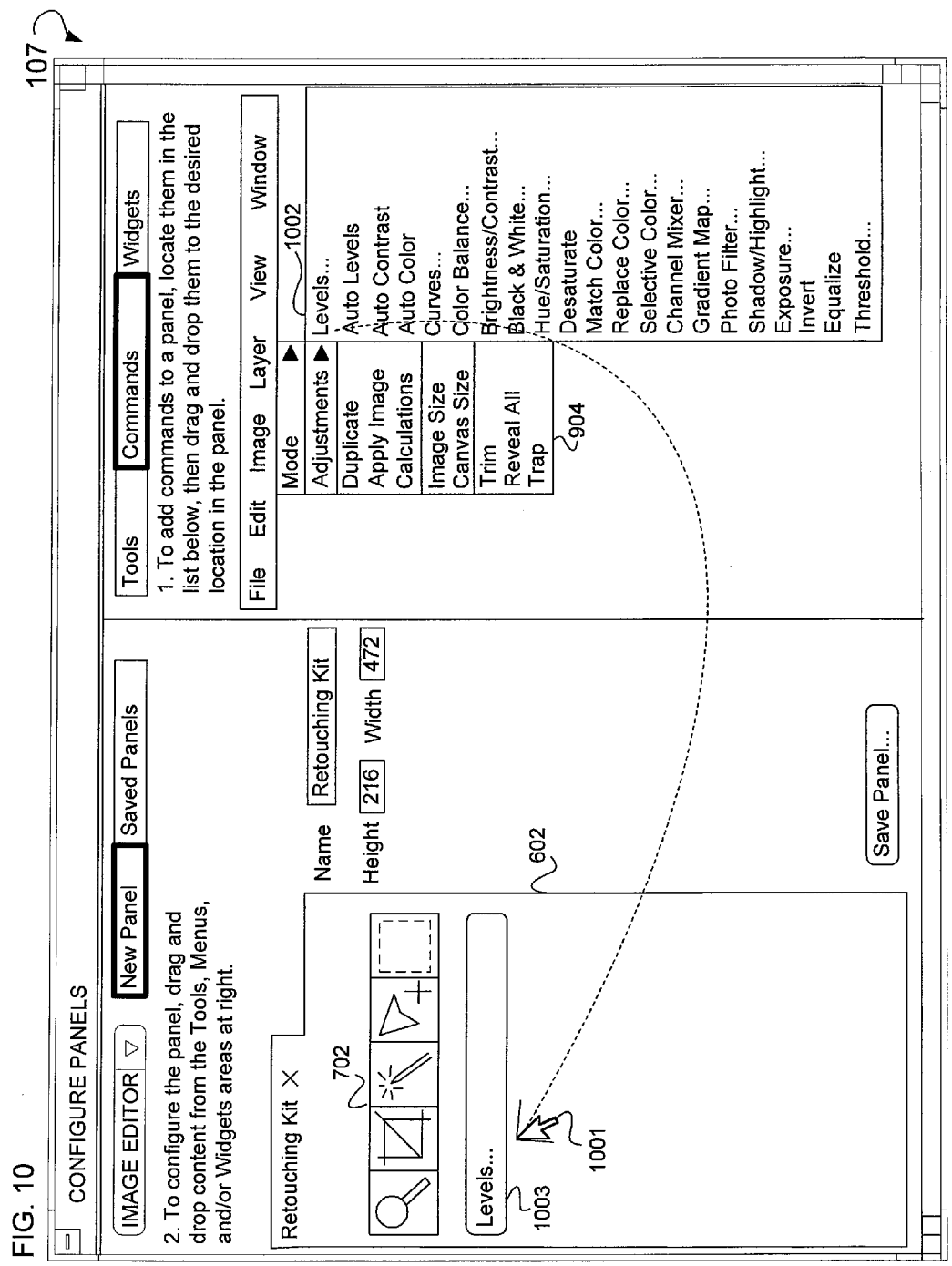
FIG. 10 is a diagram illustrating a panel configuration environment, according to an example embodiment, wherein commands are placed into the panel.

FIG. 10 is a diagram illustrating an example of the panel configuration environment 107, wherein commands are placed into the panel 602. Using a graphical pointer 1001, and functions associated therewith, the user 101 uses an input device to control the graphical pointer 1001 to select a command. For example, the command 1002 may be selected from the drop-down menu 904. This command 1002 may be dragged and placed into the panel 602 through the use of the graphical pointer 1001.

Figure 11:
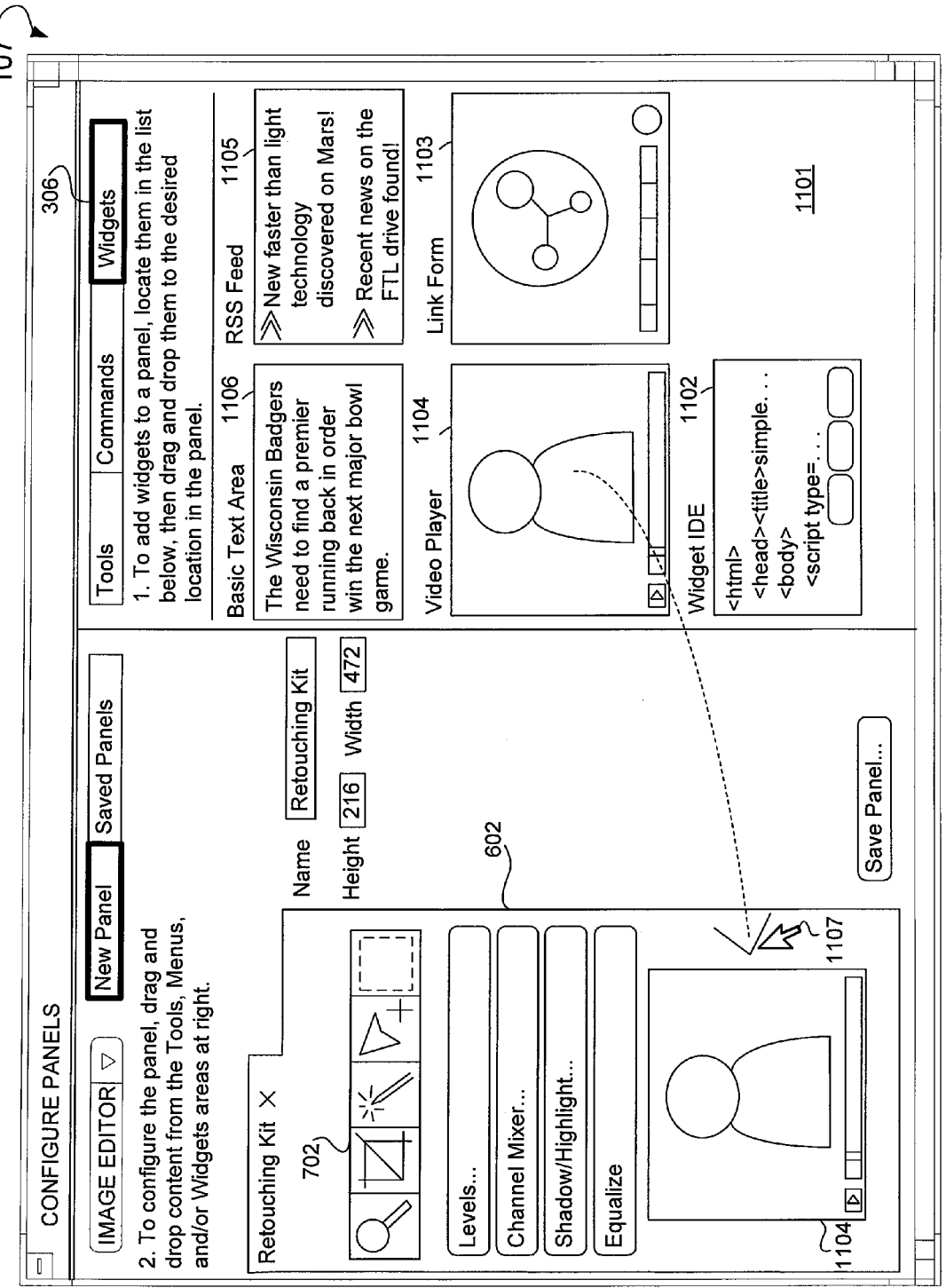
FIG. 11 is a diagram of a panel configuration environment, according to an example embodiment, illustrating the placement of a widget into a panel.

FIG. 11 is a diagram of an example panel configuration environment 107 illustrating the placement of a widget into the panel 602. Shown is a display area 1101 (the former display area 308). Included within this display area 1101 is a widget Integrated Development Environment (IDE) 1102, a link form 1103, video player 1104, a Really Simple Syndication (RSS) feed 1105, and a text area 1106. These various widgets (e.g., 1102 through 1106) may be displayed where the screen object 306 is executed or otherwise selected. Using a graphical pointer 1107, and functions associated therewith, the video player 1104 may be dragged and dropped into the panel 602.

Figure 12:
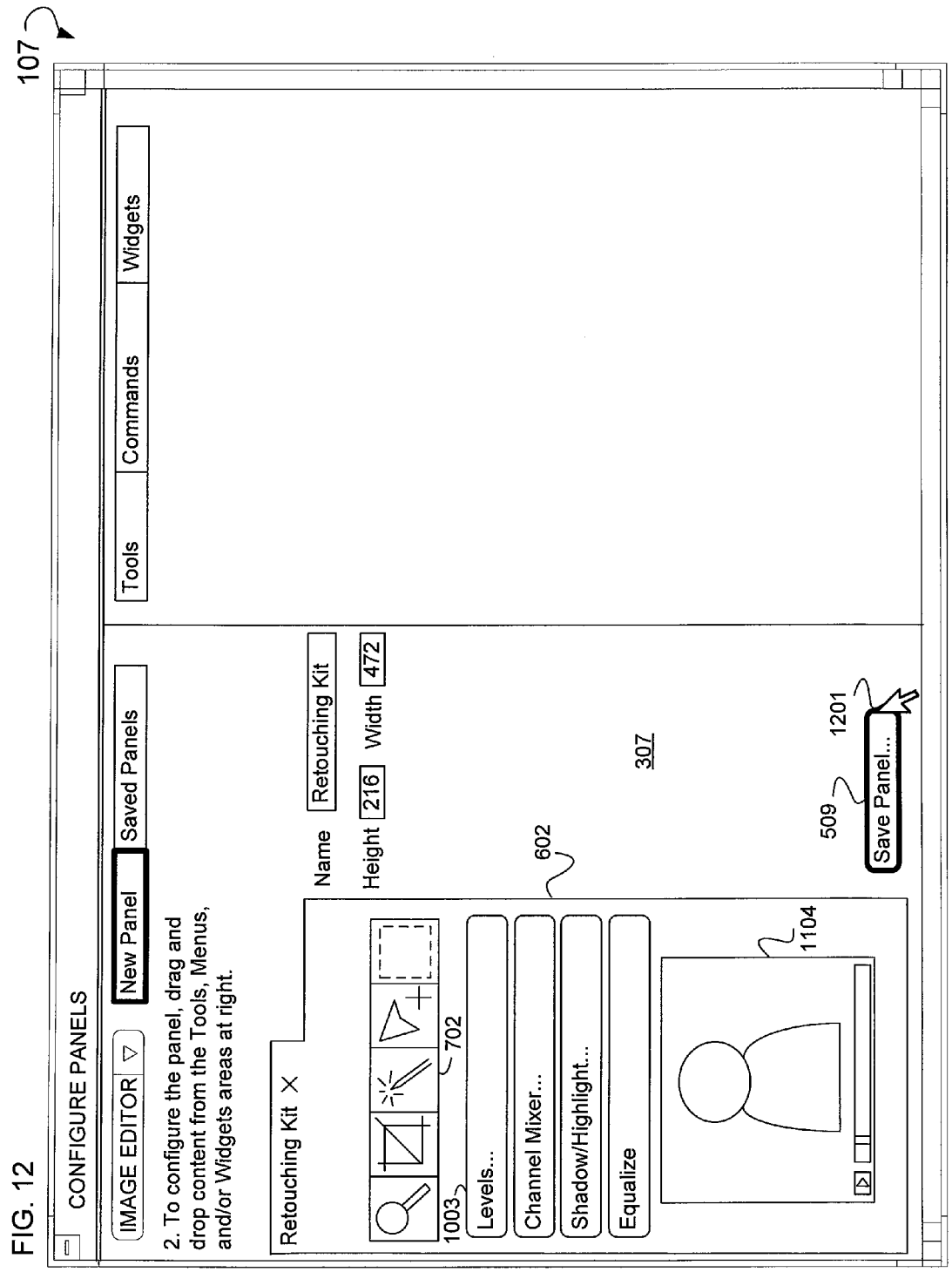
FIG. 12 is a diagram of a panel configuration environment, according to an example embodiment, illustrating a completed panel.

FIG. 12 is a diagram of an example panel configuration environment 107 illustrating a completed panel. Shown is the panel 602 displayed within the display area 307. This panel 602 includes, for example, the tool container 702, the command 1003, and the widget 1104. Using a graphical pointer 1201, and function associated therewith, the user 101 may select the previously illustrated screen object 509 to save the panel 602 for future use. This panel 602, as will be more fully shown below, may be saved as the panel definition 108.

Example Logic

Figure 13:
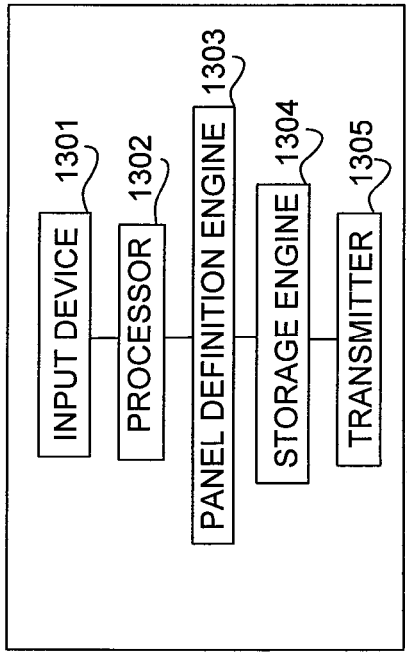
FIG. 13 is a block diagram of a computer system, according to an example embodiment, that is used to generate a panel definition.

FIG. 13 is a block diagram of an example computer system 1300 that is used to generate a panel definition. The blocks shown herein may be implemented in software, firmware, or hardware. These blocks may be directly or indirectly communicatively coupled via a physical or logical connection. The computer system 1300 may be the one or more devices 102. Shown are blocks 1301 through 1305. Illustrated is an input device 1301 to receive input identifying a panel associated with a software application, the software application including a GUI and the panel comprising a discrete area of the GUI within which to group software objects to control the software application. Communicatively coupled to the input device 1301 is a processor 1302 to process the input to identify an object of the software objects to be included in the panel. Communicatively coupled to the processor 1302 is a panel definition engine 1303 to generate a panel definition including the object and dimensions of the panel, the panel definition to be processed to render the GUI. Communicatively coupled to the panel definition engine 1303 is a storage engine 1304 to store the panel definition as a panel definition file. In some example embodiments, the panel definition file includes at least one of a panel name, an object parameter, an object definition, a placeholder definition, or a software application name. Communicatively coupled to the storage engine 1304 is a transmitter 1305 to transmit the panel definition file. In some example embodiments, the object includes at least one of a tool, a command, or a widget. Further, in some example embodiments, the dimensions include at least one of a height dimension, or a width dimension.

Figure 14:
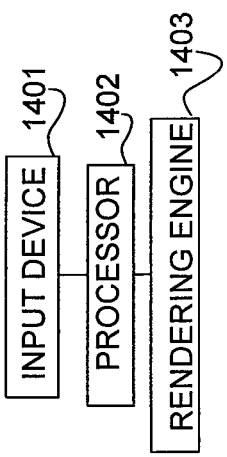
FIG. 14 is a block diagram of a computer system, according to an example embodiment, that is used to process a panel definition with a template file.

FIG. 14 is a block diagram of an example computer system 1400 that is used to process a panel definition with a template file. The blocks shown herein may be implemented in software, firmware, or hardware. These blocks may be directly or indirectly communicatively coupled via a physical or logical connection. The computer system 1400 may be the panel definition server 111. Shown are blocks 1401 through 1404. Illustrated is an input device 1401 to identify a panel definition that includes an object associated with a panel. Communicatively coupled to the input device 1401 is a processor 1402 to process the panel definition using a template file, the template file defining functionality associated with the object. Communicatively coupled to the processor 1402 is a rendering engine 1403 to render the panel, and the object associated with the panel, within a GUI associated with a software application. In some example embodiments, the panel definition is included in a panel definition file. In some example embodiments, the processor 1402 interprets the panel definition using the template file. In some example embodiments, this interpreting engine 1404 may engage in compilation with the contents of the template file serving as a grammar for the compilation. In some example embodiments, the template file includes at least one of a graphical representation of the object, and a drawing function to render the panel based upon panel dimensions. Additionally, in some example embodiments, the rendering of the panel, and objects associated with the panel, within the GUI associated with the software application includes using a parameter associated with the object. In some example embodiments, the parameter includes a position value for the object relative to the panel.

Figure 15:
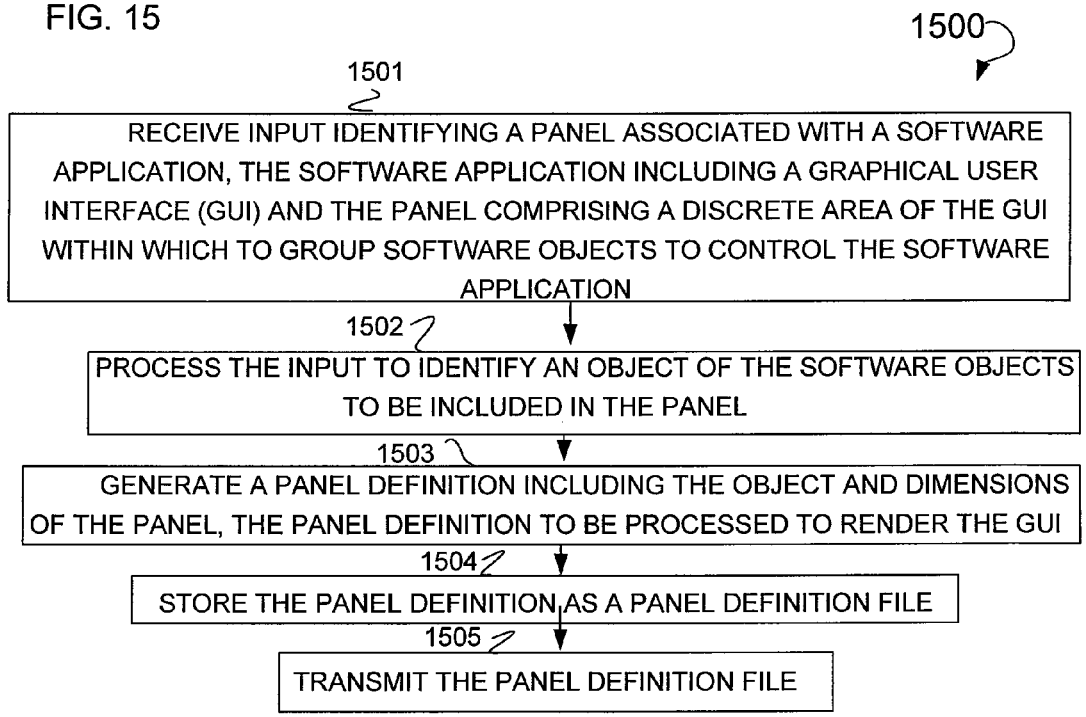
FIG. 15 is a flow chart illustrating a method, according to an example embodiment, used to generate a panel definition.

FIG. 15 is a flow chart illustrating an example method 1500 used to generate a panel definition. Shown are various operations 1501 through 1505 that may be executed upon the one or more devices 102. Shown is an operation 1501 that executed by the input device 301 to receive input identifying a panel associated with a software application, the software application including a GUI and the panel comprising a discrete area of the GUI within which to group software objects to control the software application. Operation 1502 is executed by the processor 1302 to process the input to identify an object of the software objects to be included in the panel. Processor 1302 may be a collection of logic circuits. Operation 1503 is executed by the panel definition engine 1303 to generate a panel definition including the object and dimensions of the panel, the panel definition to be processed to render the GUI. Operation 1504 is executed by the storage engine 1304 to store the panel definition as a panel definition file. The storage engine 1304 may include an interface to a database server and/or database server application. In some example embodiments, the panel definition file includes at least one of a panel name, an object parameter, an object definition, a placeholder definition, or a software application name. Operation 1505 is executed to by the transmitter 1305 to transmit the panel definition file. The transmitter 1305 may include a network interface and encoder. In some example embodiments, the object includes at least one of a tool, a command, or a widget. In some example embodiments, the dimensions include at least one of a height dimension, or a width dimension.

Figure 16:
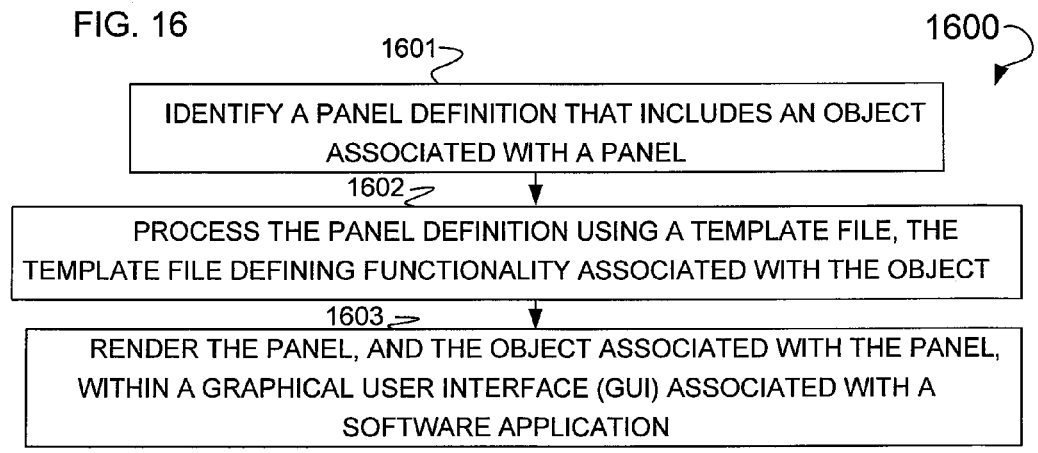
FIG. 16 is a flow chart illustrating a method, according to an example embodiment, to render a panel within a display area.

FIG. 16 is a flow chart illustrating an example method 1600 to render a panel within a display area. Shown are various operations 1601 through 1604 that may be executed upon the panel definition server 111 or the one or more devices 102. Shown is an operation 1601 that is executed by the input device 1401 to identify a panel definition that includes an object associated with a panel. Operation 1602 is executed by the processor 1402 to process the panel definition using a template file, the template file defining functionality associated with the object. The processor 1402 may be collection of logic circuits. Operation 1603 is executed to by the rendering engine 1403 to render the panel, and the object associated with the panel, within a GUI associated with a software application. In some example embodiments, the panel definition is included in a panel definition file. In some example embodiments, the operation 1602 may interpret the panel definition file. In some example embodiments, the template file includes at least one of a graphical representation of the object, and a drawing function to render the panel based upon panel dimensions. In some example embodiments, the rendering of the panel, and objects associated with the panel, within the GUI associated with the software application includes using a parameter associated with the object. Further, in some example embodiments, the parameter includes a position value for the object relative to the panel.

Figure 17:
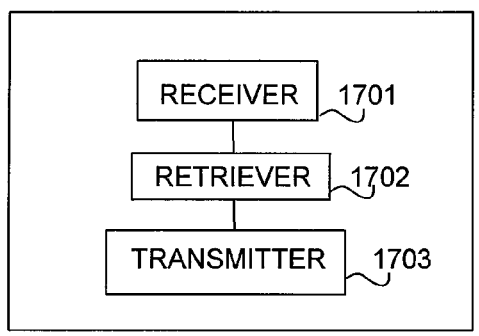
FIG. 17 is a block diagram of a computer system, according to an example embodiment, that is used to retrieve a panel definition file.

FIG. 17 is a block diagram of an example computer system 1700 that is used to retrieve a panel definition file. The blocks shown herein may be implemented in software, firmware, or hardware. These blocks may be directly or indirectly communicatively coupled via a physical or logical connection. The computer system 1700 may be the panel definition server 111. Shown are blocks 1701 through 1703. Illustrated is a receiver 1701 to receive a panel definition request identifying a panel definition. Shown is a retriever 1702 to retrieve the panel definition based upon a panel identifier value. This panel identifier value may be an integer value, a Globally Unique Identifier (GUID) value, or some other suitable value. Additionally, shown is a transmitter 1703 to transmit the panel definition for use to render a panel in a display area.

Figure 18:
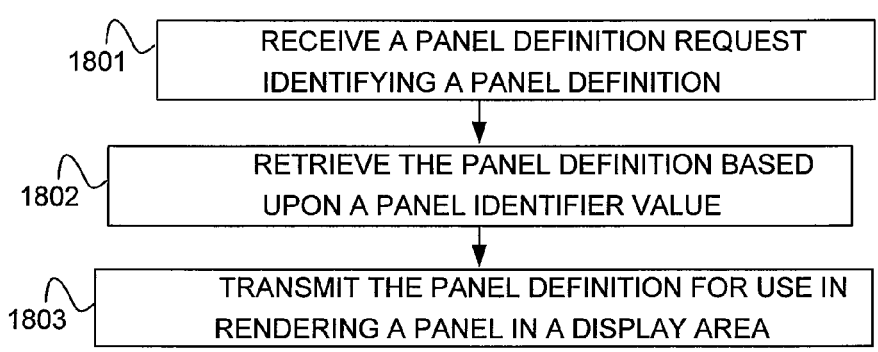
FIG. 18 is a flow chart illustrating a method, according to an example embodiment, used to retrieve a panel definition file.

FIG. 18 is a flow chart illustrating an example method 1800 to retrieve a panel definition file. The various operation outlined below may be executed by the panel definition server 111. An operation 1801 is executed by the receiver 1701 to receive a panel definition request identifying a panel definition. Operation 1802 is executed by the retriever 1702 to retrieve the panel definition based upon a panel identifier value. Operation 1803 is executed by the transmitter 1703 to transmit the panel definition for use in rendering a panel in a display area. In some example embodiments, the panel definition identifies at least one of a tool, a command, or a widget.

Figure 19:
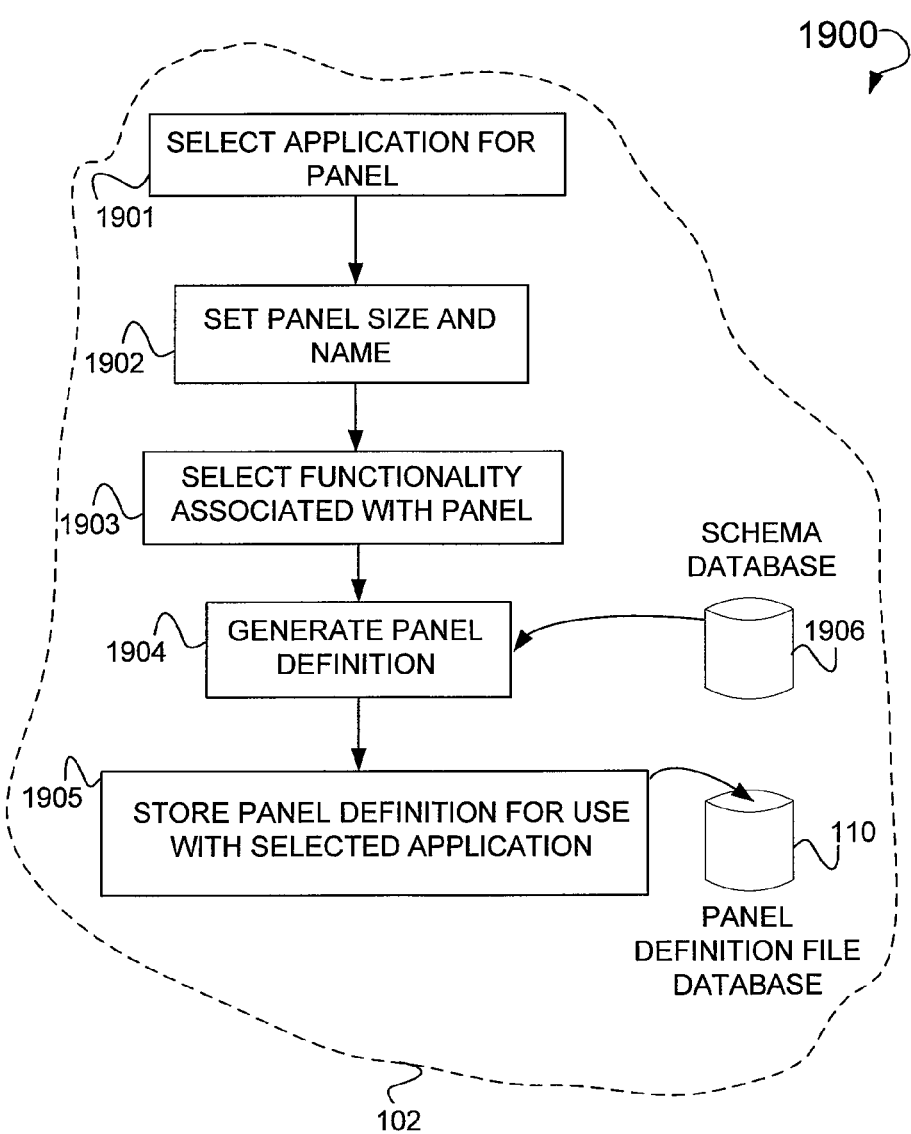
FIG. 19 is a flow chart illustrating the execution of a method, according to an example embodiment, used to generate and store the panel definition.

FIG. 19 is a flow chart illustrating the execution of an example method 1900 used to generate and store the panel definition 108. Shown are various operations 1901 through 1905 and a schema database 1906. These various operations 1901 through 1905 may be executed by the one or more devices 102, or the panel definition server 111. Shown is an operation 1901 that, when executed, selects a software application for a panel. An operation 1902 is executed that sets the size and name of a panel, where the size may be in terms of pixel values, and the title may be a string value. For example, as illustrated in FIG. 4, the height of the panel may be 216 pixels, the width 472 pixels and the title "Retouching kit." In some example embodiments, the height and width of the panel is automatically determined through the use of preset height and width values. These presets maybe determined based upon the particular software application within which the panel is to be used. Further, these preset values may be stored in the panel definition file database 110 and retrieved based upon the particular software application with which the panel is to be associated. Operation 1903 is executed to select functionality associated with this panel, where this functionality includes the selection of tools, commands and widgets to be executed using the panel (see e.g., FIG. 5 through FIG. 12). An operation 1904 is executed to generate a panel definition file using a schema retrieved from the schema database 1906. The schema may include an extensible Mark-up Language Schema Definition (XSD), a Document Type Definition (DTD), a Document Structure Description (DSD), REgular LAnguage for XML Next Generation (RELAX NG) or some other suitable type of schema. This panel definition file may be represented as the panel definition 108. Operation 1905 is executed that stores the panel definition file for use with a selected application, where this application is a software application. This panel definition file may be represented as the panel definition 108 and may be stored to the previously illustrated panel definition file database 110, or the panel definition file database 112.

In some example embodiments, the panel definition 108 is written in an eXtensible Mark-up Language (XML) and stored as a panel definition file. An example of this panel definition file, and the data described therein, is provided in the following XML pseudo code:

```
<Panel Definition>
    <Name of Application> Image Editor </Name of Application>
    <Name of Panel> Retouch Kit </Name of Panel>
    <Size of Panel>
        <X-Width> 200 </X-Width>
        <Y-Height> 300 </Y-Height>
    </Size of Panel>
    <Widget ID> A32441BD1 </Widget ID>
    <Widget Position>
        <X-Position> 35 </X-Position>
        <Y-Position> 65 </Y-Position>
    </Widget Position>
    <Tool ID> B245AF </Tool ID>
    <Tool Position>
        <X-Position> 131 </X-Position>
        <Y-Position> 232 </Y-Position>
    </Tool Position>
    <Command ID> A323999 </Command ID>
    <Command Position>
        <X-Position> 50 </X-Position>
        <Y-Position> 120 </Y-Position>
    </Command Position>
</Panel Definition>
```

The above XML pseudo code describes the software application for which the panel has been created, the name of the panel, and size of the panel in pixels. This size corresponds to dimensions used in rendering the panel. Further, widget, tool and command IDs are provided. These IDs may be hexadecimal values used to uniquely identify a widget, tool, or command (e.g., collectively referred to as objects) within the software application. These IDs may be used by the software application to retrieve each respective widget, tool, or command. Each of these widgets, tools, or commands may have position data associated with them such that they may be positioned within the panel. In addition to the above provided example XML pseudo code, code may be provided that describes, for example, a new widget definition and associated code (e.g., a scripting language definition of a widget) to implement the widget. Code may also be provided to describe a place holder widget and parameter data such as position data for this place holder widget in the panel. A place holder widget may be a widget that can be retrieved using a URL.

Figure 20:
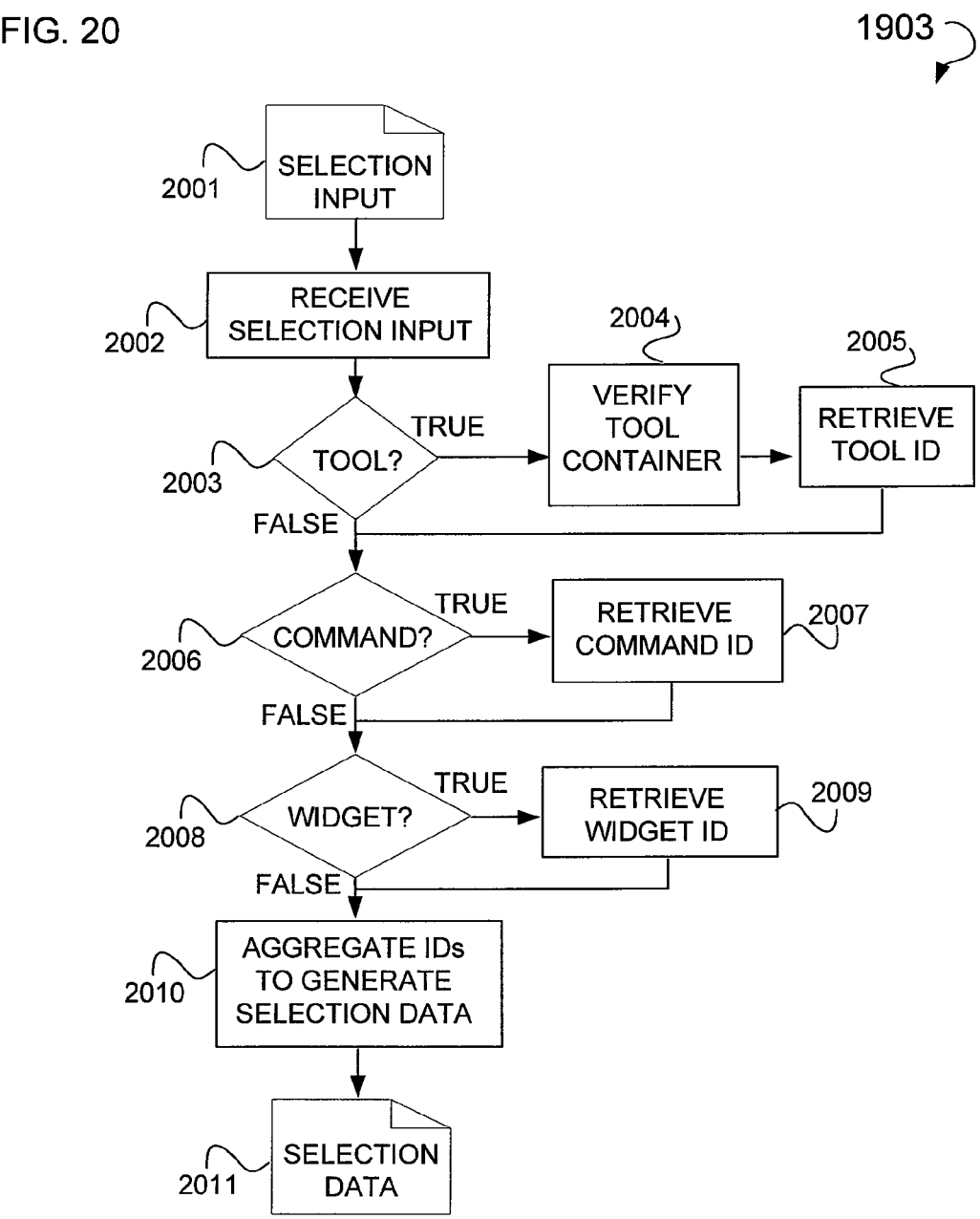
FIG. 20 is a flow chart illustrating the execution of an operation, according to an example embodiment, to select functionality associated with this panel.

FIG. 20 is a flow chart illustrating the execution of an example operation 1903. Shown is selection input 2001 where the selection input is generated through the use of input device. An operation 2002 is executed that receives the selection input 2001. A decisional operation 2003 is executed that determines whether or not the selection input includes data relating to the selection of a tool. In cases where decisional operation 2003 evaluates to "true," an operation 2004 is executed that verifies the existence of a tool container (see e.g., tool container 504 and 702). An operation 2005 is executed that retrieves a tool ID. This tool ID is, for example, a uniquely identifying numeric value that allows for a tool to be distinguished from other tools associated with a software application. In cases where decisional operation 2003 evaluates to "false," a decisional operation 2006 is executed. Decisional operation 2006 may determine whether or not the selection input 2001 contains or includes the selection of commands to be associated with a panel, such as panel 602. In cases where decisional operation 2006 evaluates to "true," an operation 2007 is executed that retrieves a command ID. This command ID is used to uniquely distinguish one command from another command associated with a software application. Further, this command ID is a uniquely identifying numeric value. In cases where decisional operation 2006 evaluates to "false," a decisional operation 2008 is executed. Decisional operation 2008 determines whether or not the selection input 2001 includes the selection of a widget. In cases where decisional operation 2008 evaluates to "true," an operation 2009 is executed that retrieves a widget ID. A widget ID is a numeric value that is used to uniquely distinguish one widget from another widget associated with a software application. In cases where decisional operation 2008 evaluates to "false," an operation 2010 is executed. Operation 2010 is executed to aggregate the IDs of the tools, commands or widgets, and then associate these aggregated IDs to generate selection data 2011.

Figure 21:
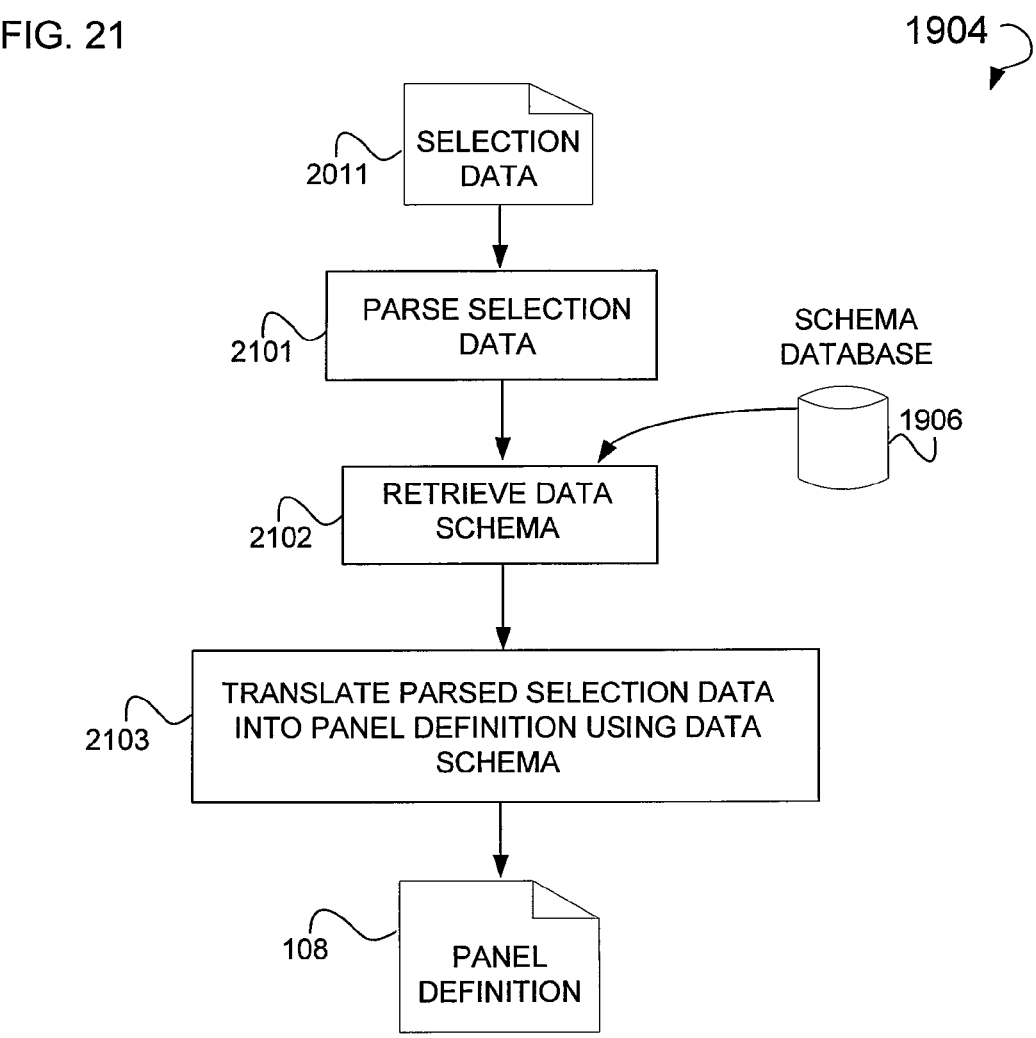
FIG. 21 is a flow chart illustrating the execution of operation, according to an example embodiment, to generate a panel definition using a schema retrieved from the schema database.

FIG. 21 is a flow chart illustrating the execution of an example operation 1904. Shown is selection data 2011 that is received and parsed through via the execution of operation 2101. An operation 2102 is executed that retrieves a data schema from the schema database 1906. An operation 2103 is executed that translates the parsed selection data into a panel definition using the data schema. The results of the execution of operation 2103 is the previously illustrated panel definition 108.

Figure 22:
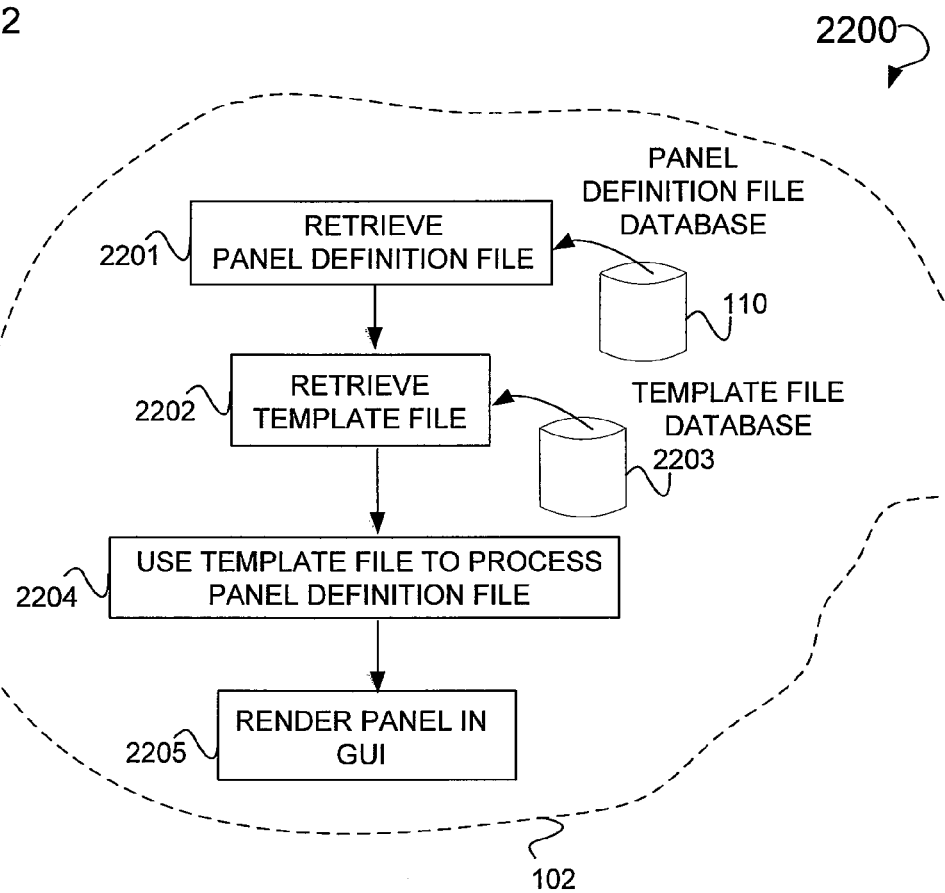
FIG. 22 is a flow chart illustrating the execution of method, according to an example embodiment, used to render a panel within a display area of a GUI.

FIG. 22 is a flow chart illustrating the execution of an example method 2200 used to render a panel within a display area of a GUI (see e.g., application 115). Shown are operations 2201 through 2205, and a template file database 2203. These various operations 2201 through 2205, and a template file database 2203 reside upon, or are otherwise be executed by the one or more devices 102, or panel definition server 111. Operation 2201 is executed that retrieves the panel definition 108 from the panel definition file database 110. An operation 2202 is executed that retrieves a template file from a template file database 2203. This template file may be in the form of an SWF file, or other file written in a suitable scripting language.

An operation 2204 is executed that uses the template file to process the panel definition 108. This operation 2204 acts a panel configuration engine. An operation 2205 is executed that renders the results of the execution of operation 2204 within a display area or GUI.

Figure 23:
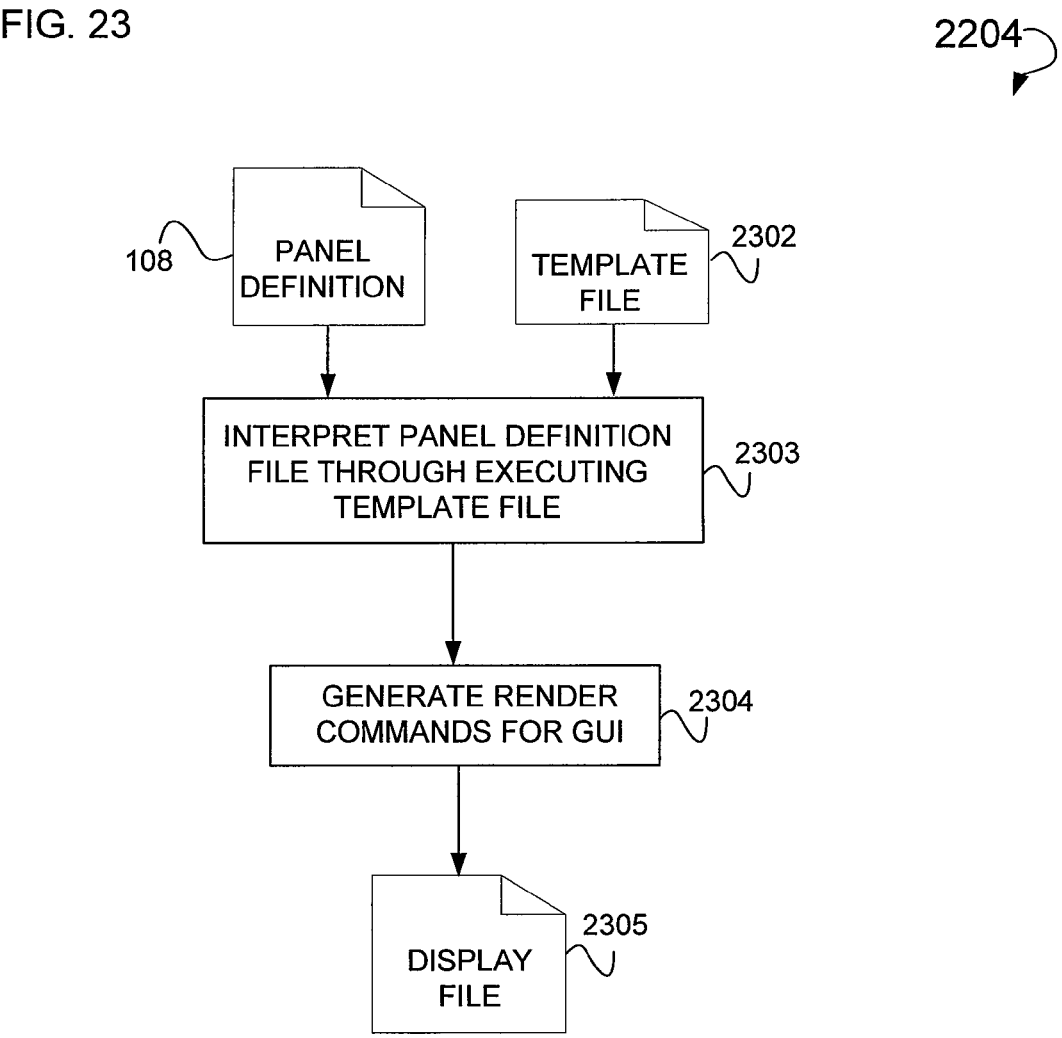
FIG. 23 is a flow chart illustrating the execution of operation, according to an example embodiment, that uses the template file to process a panel definition.

FIG. 23 is a flow chart illustrating the execution of an example operation 2204. Shown is a panel definition 108 and a template file 2202. An operation 2303 is executed that interprets the panel definition 108 through executing the template file 2302. An operation 2304 is executed that generates render commands for a GUI. In some example embodiments, this GUI is the GUI for the application 115. A display file 2305 is generated through the execution of operation 2304, wherein this display file may include information relating to the panel 602 and associated tool container 702, commands 1003, and widget 1104.

Figure 24:
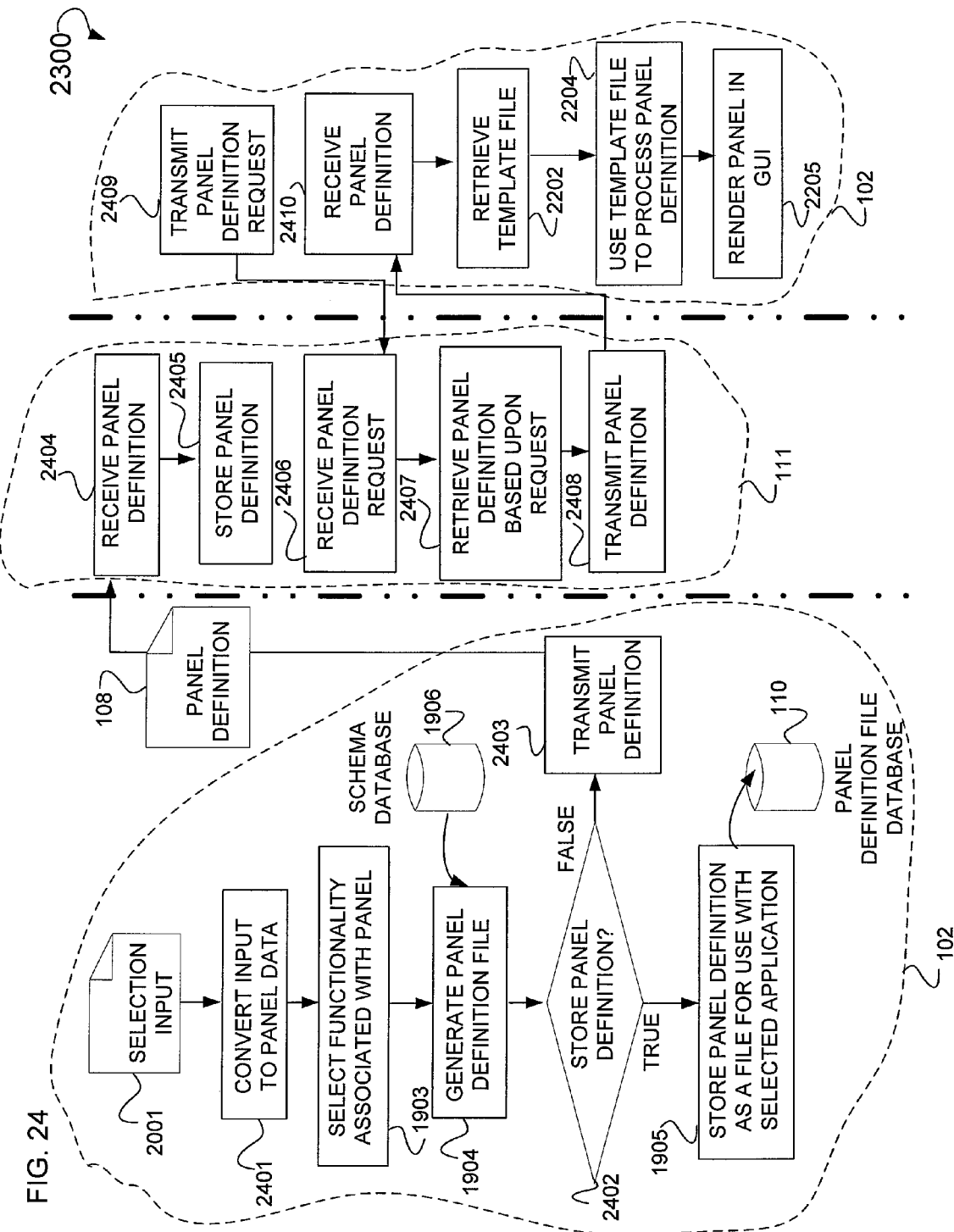
FIG. 24 is a flow chart illustrating the execution of a method, according to an example embodiment, used to generate and display a panel definition.

FIG. 24 is a flow chart illustrating the execution of an example method 2400 used to generate and display the panel definition 108. Shown are operations 2401, 1903, 1904, 2402, 2403 and 1905 that may be executed by the one or more devices 102. Also shown, are operations 2404 through 2408 that may be executed by the panel definition server 111. Further shown, are operations 2409, 2410, 2202, 2204 and 2205 that may be executed by the one or more devices 102. In some example embodiments, the selection input 2001 is received through the execution of operation 2401. This operation 2401 converts the input contained within the selection input 2001 to panel data. The operation 1903 is executed to select functionality associated with, for example, the panel 602. The operation 1904 is executed to generate the panel definition 108 through accessing a schema included within the schema database 1906. A decisional operation 2402 is executed that determines whether or not to store the panel definition 108 as a panel definition file. In example cases where decisional operation 2402 evaluates to "true," the operation 1905 is executed that store the panel definition 108 for use with the selected application into the panel definition file database 110. In cases where decisional operation 2402 evaluates to "false," an operation 2403 is executed that transmits the panel definition 108. This panel definition 108 is received through the execution of operation 2404. An operation 2405 is executed that stores the panel definition into the panel definition file database 112 as a panel definition file. An operation 2409 is executed by the user 113 to transmit a panel definition request 114 that is received through the execution of operation 2406. An operation 2407 is executed that retrieves the panel definition 108 from the panel definition file database 112. An operation 2408 is executed that transmits the panel definition 108 to be received through the execution of operation 2410. The operation 2102 is executed to retrieve a template file. Operation 2204 is executed that uses a template file to process the panel definition 108. The operation 2205 is then executed to render the panel within a display area or GUI.

In some example embodiments, the operation 2404 through 2408 may be execute by the panel definition server 111 acting to serve a community of users that exchange panel definition files via the panel definition server 111. In one example embodiment, the user 101 uploads the panel definition file 108 to the panel definition server 111. The user 113 is then able to download this panel definition file 108 through sending the panel definition request 114 to the panel definition server 111. In some example embodiments, a community of users may develop around the exchange of panel definition files. This exchange may be free, or may be based upon the tendering of a monetary payment for the panel definition file.

Figure 25:
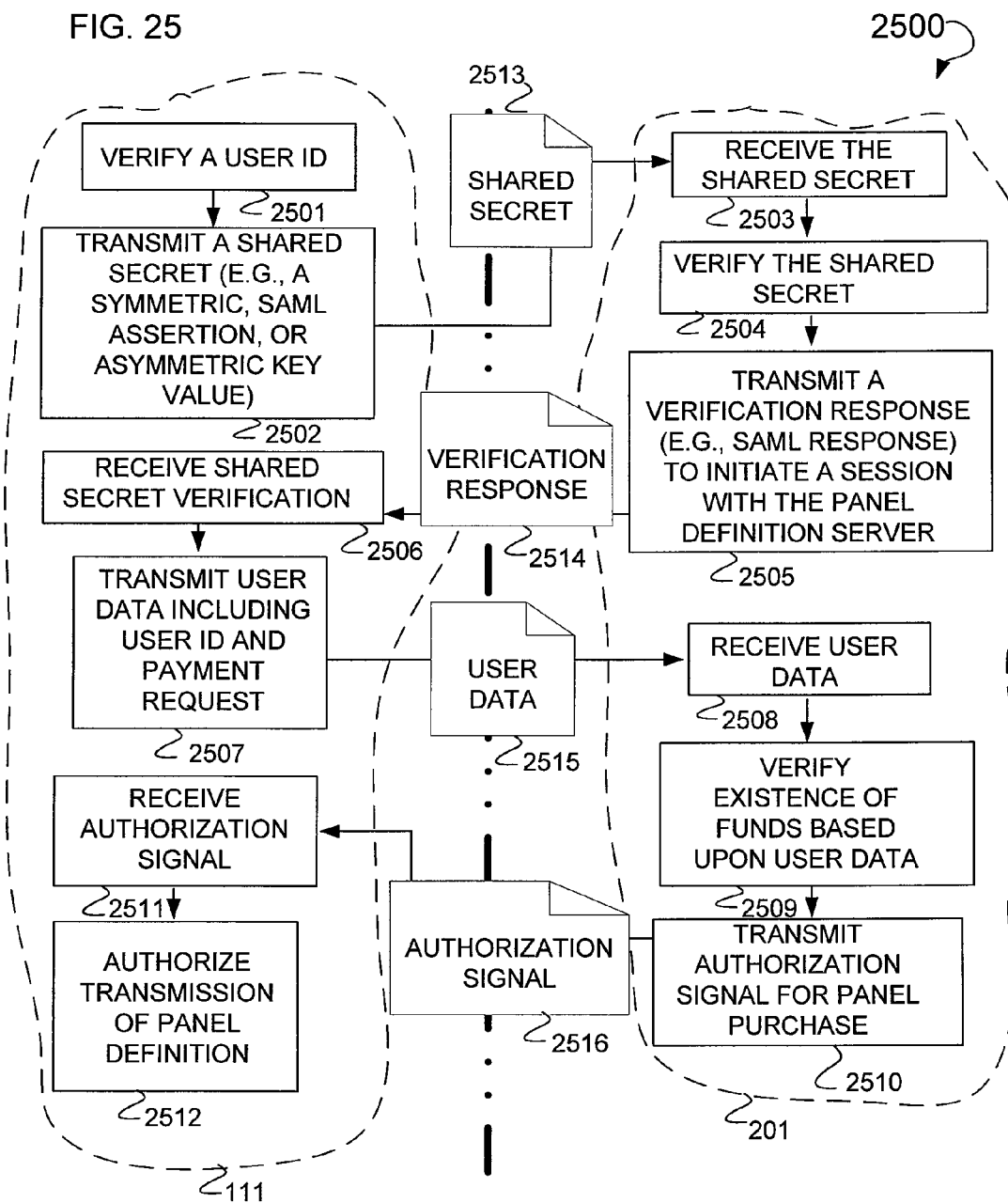
FIG. 25 is a dual-stream flow chart illustrating a method, according to an example embodiment, that provides a panel definition in exchange for some type of monetary compensation.

FIG. 25 is a dual-stream flow chart illustrating example method 2500 that provides the panel definition 108 in exchange for some type of monetary compensation. Shown are operations 2501, 2502, 2506, 2507, 2511 and 2512 that may reside upon, or otherwise be executed by the panel definition server 111. Also shown, are operations 2503 through 2505, and operations 2508 through 2510 that may reside upon or otherwise be executed by the commerce server 201. In some example embodiments, an operation 2501 is executed that verifies the user ID. This user ID may be a uniquely identifying identification value associated with the user 113. A password and login value may be a user ID. An operation 2502 is executed that transmits a shared secret from the panel definition server 111 to be received by the commerce server 201. In cases where the shared secret is verified, a session may be established between the panel definition server 111, and the commerce server 201. This shared secret may be a symmetric or asymmetric key value, a Security Mark-up Language (SAML) assertion, or some other suitable type of shared secret. This shared secret may be received through the execution of operation 2503. An operation 2504 is executed that verifies a shared secret. Verification may be in the form of pairing a private key with a public key to validate the shared secret. Further, verification may include comparing a private key included within the shared secret 2513, with another private key stored and retrieved via the execution of operation 2504, or through verification via the SAML assertion. An operation 2505 is executed to transmit a verification response 2514 to be received through the execution of operation 2506. This verification response may be, for example, a SAML response, or some other response that is used to verify a session between the panel definition server 111 and the commerce server 201. An operation 2507 is executed that transmits user data, including the user ID and payment request information, to be received through the execution of operation 2508. This user ID may be in the form of user data 2515. An operation 2509 is executed that verifies the existence of the user ID, and funds associated with the user ID (e.g., it verifies user data). An operation 2510 is executed that transmits an authorization signal 2516 verifying the existence of funds for the purchase of the panel definition 108 by the user 113. This authorization signal 2516 is transmitted and received through the execution of operation 2511. An operation 2512 is executed that authorizes transmission of the panel definition 108 by the panel definition server 111. Authorization signal 2516 includes, for example, some type of boolean value or, some type of alpha-numeric or numeric value uniquely identifying the session that has been established between the panel definition server 111 and commerce server 201.

Example Database

Some embodiments may include the various databases (e.g., 110, 112, 1906, or 2103) being relational databases, or, in some cases, On Line Analytic Processing (OLAP)-based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Figure 26:
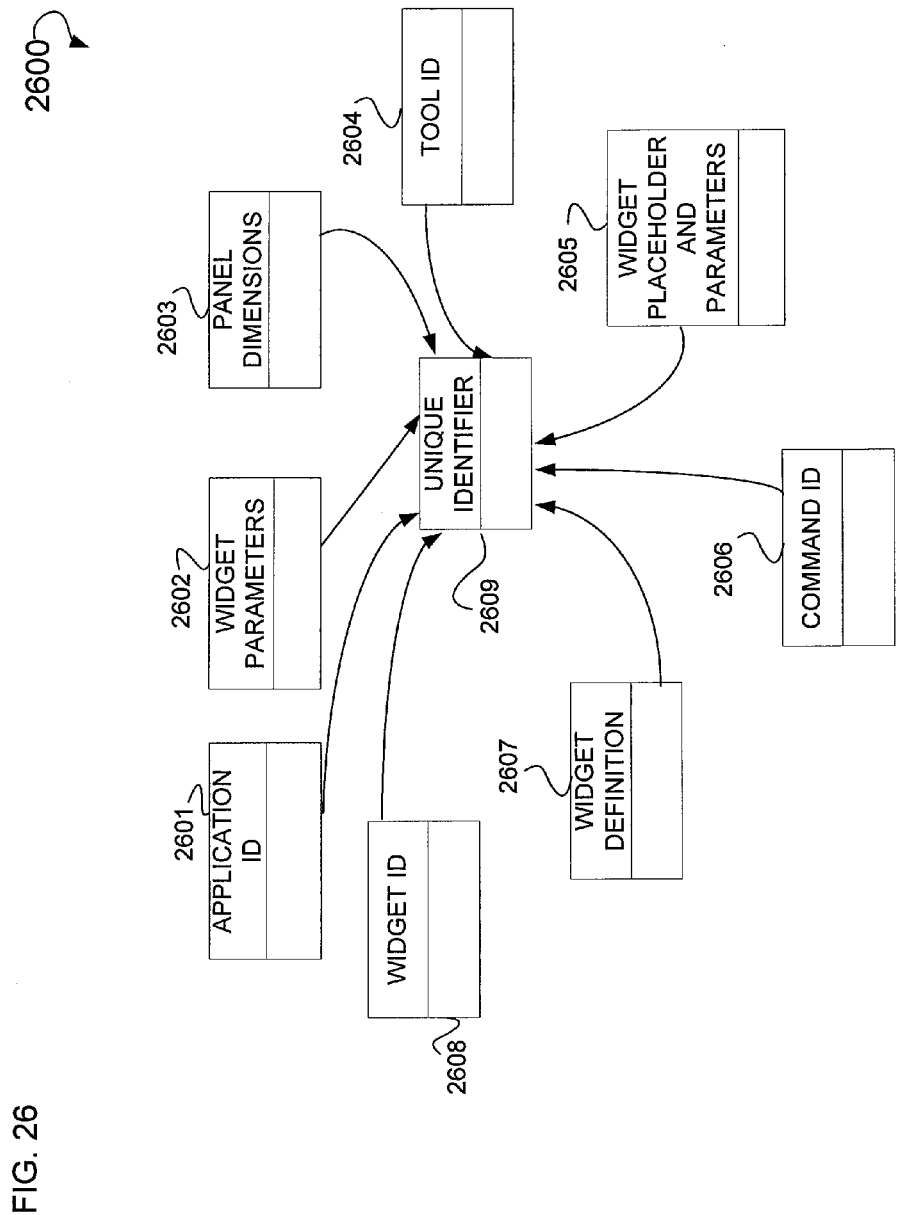
FIG. 26 is an example Relational Date Scheme (RDS), according to an example embodiment.

FIG. 26 is an example Relational Date Scheme (RDS) 2600. Shown is a table 2601 that includes an application ID. This application ID may be a numeric value used to uniquely identify a software application, or a plurality of software applications. These application IDs may be stored into the table 2601 using some type of string, integer, XML, or other suitable data type. A table 2602 is shown that includes widget parameters. These widget parameters may be values defining the size and orientation of a widget within the panel 602 and pixel values. These widget parameters are stored into the table 2602 using an integer, XML, or other suitable data type. A table 2603 is shown that includes panel dimensions. These panel dimensions may be pixel values or other suitable values that may be stored into the table 2603 using an integer, XML, or other suitable data type. A table 2604 is shown that includes a tool ID. This tool ID may be a uniquely identifying value that is used to distinguish one tool from another tool associated with a particular software application. These tool IDs may be stored into the table 2604 using a string, integer, XML, or other suitable data type. A table 2605 is shown that includes widget place holders, and parameter data. This widget place holder and parameter data may include pixel values and orientation values of a widget to be displayed within the panel 602. This widget place holder and parameter data may be stored as, for example, a string or XML data type. A table 2606 is shown that includes a command ID, wherein this command ID is some type of uniquely identifying value used to distinguish one command from another command associated with a software application. An integer or XML data type may be used to store a command ID. A table 2607 is shown to include widget definitions. A widget definition may be a scripting language based definition of a widget. The widget definition may be stored into the table 2607 as a Binary Large Object (BLOB), or XML data type. A table 2608 is shown that includes a widget ID, wherein a widget ID is a value used to uniquely identify a widget associated with a software application. The widget ID may be stored into the table 2608 using an integer, or XML data type. Also shown is a table 2609 that includes unique identifier values. These unique identifier values serve as key values to uniquely identify the various entries in the tables 2601 through 2608. These uniquely identifying key values may be in the form of an integer, or other suitable data types.

Component Design

Some example embodiments may include the above-illustrated operations being written as one or more software components. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. These components are linked to other components via various APIs and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is located remotely from a second computer system including an interface level (e.g., a GUI). These first and second computer systems can configure in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A System of Transmission between a Server and Client

Some embodiments may use the Open Systems Interconnection (OSI) model or Transmission Control Protocol (TCP)/IP protocol stack model for defining the protocols used by a network to transmit data. Operations that may uses these protocols may include operations 2403, 2404, 2407, 2408, 2409, 2410, 2502, 2503, 2507, 2508, 2510, and 2511. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, LAN, WAN, or some other suitable network. In some cases, Internet refers to a network of networks. These networks may use a variety of protocols for the exchange of data, including the aforementioned TCP/IP, or some other suitable protocol. These networks may be organized within a variety of topologies (e.g., a star topology) or structures.

A Computer System

FIG. 27 shows a diagrammatic representation of a machine in the example form of a computer system 2700 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2700 includes a processor 2702 (e.g., a CPU, a Graphics Processing Unit (GPU) or both), a main memory 2701, and a static memory 2706, which communicate with each other via a bus 2708. The computer system 2700 may further include a video display unit 2710 (e.g., a Liquid Crystal Display (LCD) or a Cathode Ray Tube (CRT)). The computer system 2700 also includes an alphanumeric input device 2717 (e.g., a keyboard), a User Interface (UI) (e.g., GUI) cursor controller 2711 (e.g., a mouse), a drive unit 2716, a signal generation device 2718 (e.g., a speaker) and a network interface device (e.g., a transmitter) 2720.

The disk drive unit 2716 includes a machine-readable medium 2722 on which is stored one or more sets of instructions and data structures (e.g., software) 2721 embodying or used by any one or more of the methodologies or functions illustrated herein. The software instructions 2721 may also reside, completely or at least partially, within the main memory 2701 and/or within the processor 2702 during execution thereof by the computer system 2700, the main memory 2701 and the processor 2702 also constituting machine-readable media.

The instructions 2721 may further be transmitted or received over a network 2726 via the network interface device 2720 using any one of a number of well-known transfer protocols (e.g., Hyper Text Transfer Protocol (HTTP), Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for sharing panel definitions among a plurality of users, the method comprising:
   receiving, at a panel definition server from a first user device via a network, a first panel definition for a panel corresponding with a software application, the software application including a graphical user interface (GUI), the panel comprising an area of the GUI within which to group software objects employable by a user to control the software application, the first panel definition comprising data indicating the software objects included in the panel and positions of the software objects within the panel, the first panel definition configured to be processed by a template file corresponding to the first panel definition, wherein the template file is configured to be executed within the software application to interpret the first panel definition to generate render commands for the panel within the GUI;
   storing the first panel definition in a panel definition database comprising a plurality of panel definitions;
   receiving, via the network, from the software application executing on a second user device, a request for the first panel definition;
   obtaining authorization for the second user device to access the first panel definition in response to exchange of panel definitions from the second user device via the panel definition server;
   retrieving, based on the request, the first panel definition from the panel definition database; and
   transmitting, in response to retrieving the first panel definition, the first panel definition to the second user device to render the panel within the GUI of the software application.

2. The method of claim 1, further comprising:
   rendering, within the software application executing at the second user device, the panel using the first panel definition.

3. The method of claim 2, further comprising:
   retrieving, from a template database, the template file corresponding to the first panel definition; and
   executing, within the software application executing at the second user device, the template file to interpret the first panel definition;
   wherein the rendering of the panel comprises generating the render commands for the GUI of the software application based on the executing of the template file.

4. The method of claim 3, the template file describing functionality of at least one of the software objects of the first panel definition.

5. The method of claim 3, the retrieving of the template file performed by the panel definition server, the method further comprising transmitting, from the panel definition server to the first user device via the network, the template file.

6. The method of claim 3, the retrieving of the template file performed by the first user device via the network.

7. The method of claim 3, the template file comprising an executable file written in a scripting language.

8. The method of claim 3, the template file comprising at least one of a graphical representation of at least one of the software objects of the first panel definition and a drawing function to render the panel and the at least one of the software objects.

9. The method of claim 2, the rendering of the panel using the first panel definition comprises employing a parameter associated with at least one of the software objects of the panel to position the at least one of the software objects relative to the panel.

10. The method of claim 1, wherein the software objects comprise at least one of a tool, a command, and a widget.

11. The method of claim 1, further comprising:
retrieving, from the panel definition database, predetermined dimensions for the panel based on an identity of the software application; and
storing, in the first panel definition, the predetermined dimensions for the panel.

12. A panel definition server comprising:
at least one processor; and
memory comprising instructions that, when executed by the at least one processor, cause the panel definition server to perform operations comprising:
receiving, from a first user device via a network, a first panel definition for a panel corresponding with a software application, the software application including a graphical user interface (GUI), the panel comprising an area of the GUI within which to group software objects employable by a user to control the software application, the first panel definition comprising data indicating the software objects included in the panel and positions of the software objects within the panel, the first panel definition configured to be processed by a template file corresponding to the first panel definition, wherein the template file is configured to be executed within the software application to interpret the first panel definition to generate render commands for the panel within the GUI;
storing the first panel definition in a panel definition database comprising a plurality of panel definitions;
receiving, via the network, from the software application executing on a second user device, a request for the first panel definition;
obtaining authorization for the second user device to access the first panel definition in response to exchange of panel definitions from the second user device via the panel definition server;
retrieving, based on the request, the first panel definition from the panel definition database; and
transmitting, in response to retrieving the first panel definition, the first panel definition to the second user device to render the panel within the GUI of the software application.

13. The panel definition server of claim 12, the operations further comprising:
retrieving, from a template database in response to the request, the template file corresponding to the first panel definition; and
transmitting, to the software application executing at the second user device, the template file for interpreting the first panel definition.

14. The panel definition server of claim 13, the template file describing functionality of at least one of the software objects of the first panel definition.

15. The panel definition server of claim 13, the template file comprising at least one of a graphical representation of at least one of the software objects of the first panel definition and a drawing function to render the panel and the at least one of the software objects.

16. The panel definition server of claim 12, the operations further comprising:
establishing a communication session with a commerce server;
transmitting, to the commerce server, a user identifier for a user of the second user device, and a payment request; and
receiving, from the commerce server, an authorization verifying existence of funds of the user for the payment request;
wherein the transmitting of the first panel definition is performed in response to the receiving of the authorization.

17. The panel definition server of claim 12, the operations further comprising:
receiving, from the first user device via the network, prior to receiving the first panel definition, an indication of the software application corresponding to the first panel definition; and
transmitting, to the first user device via the network, in response to the indication, preset dimensions for the panel based upon the indication of the software application.

18. The panel definition server of claim 17, the operations further comprising retrieving the preset dimensions for the panel from the panel definition database based on the indication.

19. A non-transitory computer-readable storage medium comprising instructions that, when executed by at least one processor of a machine, cause the machine to operations comprising:
receiving, from a first user device via a network, a first panel definition for a panel corresponding with a software application, the software application including a graphical user interface (GUI), the panel comprising an area of the GUI within which to group software objects employable by a user to control the software application, the first panel definition comprising data indicating the software objects included in the panel and positions of the software objects within the panel, the first panel definition configured to be processed by a template file corresponding to the first panel definition, wherein the template file is configured to be executed within the software application to interpret the first panel definition to generate render commands for the panel within the GUI;
storing the first panel definition in a panel definition database comprising a plurality of panel definitions;
receiving, via the network, from the software application executing on a second user device, a request for the first panel definition;
obtaining authorization for the second user device to access the first panel definition based on a monetary compensation from the second user device via a panel definition server;
retrieving, based on the request, the first panel definition from the panel definition database; and
transmitting, in response to retrieving the first panel definition, the first panel definition to the second user device to render the panel within the GUI of the software application.

20. The method of claim 1, wherein the request for the first panel definition is initiated by a user of the software application.

21. The media of claim 19, further comprising verifying authorization based on a shared secret transmitted from the panel definition server to a commerce server before establishing a transaction session between the panel sever and the commerce server, wherein the transaction session are for the panel definitions, which include one or more widgets that are stored as binary large objects (blobs).

* * * * *